US012592057B2

(12) United States Patent
Munn et al.

(10) Patent No.: US 12,592,057 B2
(45) Date of Patent: Mar. 31, 2026

(54) SYSTEM AND METHOD FOR DETECTING AND CLASSIFYING RETINAL MICROANEURYSMS

(71) Applicant: EMAGIX, INC., Halifax (CA)

(72) Inventors: Colyn Munn, Halifax (CA); Lyn Kamintsky, Halifax (CA); Alon Friedman, Halifax (CA); James Kukurin, Halifax (CA); Amirreza Abbasnejad, Halifax (CA)

(73) Assignee: EMAGIX, INC., Halifax (CA)

( * ) Notice: Subject to any disclaimer, the term of this patent is extended or adjusted under 35 U.S.C. 154(b) by 302 days.

(21) Appl. No.: 18/568,927

(22) PCT Filed: Jun. 10, 2022

(86) PCT No.: PCT/CA2022/050926
§ 371 (c)(1),
(2) Date: Dec. 11, 2023

(87) PCT Pub. No.: WO2022/256935
PCT Pub. Date: Dec. 15, 2022

(65) Prior Publication Data
US 2024/0282082 A1      Aug. 22, 2024

Related U.S. Application Data

(60) Provisional application No. 63/209,620, filed on Jun. 11, 2021.

(51) Int. Cl.
G06V 10/764      (2022.01)
G06T 7/00      (2017.01)
(Continued)

(52) U.S. Cl.
CPC .......... G06V 10/764 (2022.01); G06T 7/0016 (2013.01); G06T 7/11 (2017.01);
(Continued)

(58) Field of Classification Search
CPC .... G06V 10/764; G06V 10/26; G06V 10/761; G06V 40/197; G06V 2201/03;
(Continued)

(56) References Cited

U.S. PATENT DOCUMENTS 8,879,813 B1      11/2014  Solanki et al.
10,282,841 B1 *    5/2019  Parsons-Wingerter ......................
                                                              G06T 7/0014
(Continued)

OTHER PUBLICATIONS

Li, P., He, Y., Wang, P et al. "Synthesizing multi-frame high-resolution fluorescein angiography images from retinal fundus images using generative adversarial networks." BioMed Eng OnLine 22, 16 (2023). https://doi.org/10.1186/s12938-023-01070-6 Publised Feb. 21, 2023.*

(Continued)

*Primary Examiner* — Wesley J Tucker
(74) *Attorney, Agent, or Firm* — Bhole IP Law; Marc Lampert

(57)      ABSTRACT

Systems and methods for detecting and classifying retinal microaneurysms. The method including: receiving a time sequence of fluorescein angiography input images; generating a binary map of hyperfluorescent elements in the input images; determining which hyperfluorescent elements in the binary map are microaneurysms, by grading each against a combination of morphological metrics; classifying each of the detected microaneurysms as leaky or not leaky, the classification having: identifying an outer ring mask surrounding the detected microaneurysm in the binary map; identifying parenchyma in the outer ring mask using a fluorescence intensity determination; determining a rate of change of fluorescence intensity of the identified parenchyma over time; and classifying the detected microaneurysm as leaky where the rate of change is positive and not (Continued)

= Non-Leaky Microaneurysm
= Leaky Microaneurysm leaky where the rate of change is negative or zero; and outputting the classifications of the detected microaneurysms.

20 Claims, 19 Drawing Sheets

(51) Int. Cl.

| | |
|---|---|
| *G06T 7/11* | (2017.01) |
| *G06T 7/174* | (2017.01) |
| *G06T 7/33* | (2017.01) |

(52) U.S. Cl.
CPC .............. *G06T 7/174* (2017.01); *G06T 7/337* (2017.01); *G06T 2207/10064* (2013.01); *G06T 2207/30041* (2013.01); *G06T 2207/30104* (2013.01)

(58) Field of Classification Search
CPC ....... G06V 40/193; G06T 7/0016; G06T 7/11; G06T 7/174; G06T 7/337; G06T 2207/10064; G06T 2207/30041; G06T 2207/30104; G06T 7/136; G06T 7/155; G06T 2207/10016; G06T 2207/30101; G06T 7/0012; G06T 7/33; A61B 3/12
See application file for complete search history.

(56) References Cited

U.S. PATENT DOCUMENTS

| | | | | | |
|---|---|---|---|---|---|
| 11,666,210 | B2 * | 6/2023 | Wang | ................... | G06T 7/0014 |
| | | | | | 382/128 |
| 11,790,523 | B2 * | 10/2023 | Niemeijer | ........... | G06V 10/454 |
| | | | | | 382/128 |
| 12,079,987 | B2 * | 9/2024 | Ehlers | ................... | G06T 7/0012 |
| 2012/0257164 | A1 * | 10/2012 | Zee | ........................ | A61B 3/12 |
| | | | | | 351/246 |
| 2014/0199306 | A1 * | 7/2014 | Ghosh | ....................... | A61P 9/10 |
| | | | | | 424/139.1 |
| 2017/0252213 | A1 * | 9/2017 | Furuuchi | ............. | A61F 9/00821 |
| 2018/0068440 | A1 * | 3/2018 | Tang | ...................... | G06T 7/0012 |
| 2018/0315193 | A1 * | 11/2018 | Paschalakis | ......... | G06V 40/197 |
| 2019/0191988 | A1 * | 6/2019 | Gargeya | ............... | A61B 3/1241 |
| 2020/0027208 | A1 * | 1/2020 | Madabhushi | ......... | G06T 7/0012 |
| 2020/0034669 | A1 * | 1/2020 | Ordonez | ................. | G06N 3/08 |
| 2022/0254500 | A1 * | 8/2022 | El-Baz | .................. | G06T 7/0012 |
| 2022/0319708 | A1 * | 10/2022 | Hart | ...................... | G16H 50/70 |
| 2023/0036134 | A1 * | 2/2023 | Solanki | ................. | G06F 16/583 |
| 2023/0214993 | A1 * | 7/2023 | Katz | ...................... | G06T 7/0012 |
| 2024/0177305 | A1 * | 5/2024 | Abramoff | .............. | G06F 18/00 |
| 2024/0268665 | A1 * | 8/2024 | Munn | .................... | G16H 50/50 |

OTHER PUBLICATIONS

Dubow, Michael, et al. Classification of Human Retinal Microaneurysms Using Adaptive Optics Scanning Light Ophthalmoscope Fluorescein Angiography, Investigative ophthalmology & Visual science, vol. 55 No. 3, Mar. 2014, 1299-1309.

International Search report for PCT/CA2022/050926, prepared by the Canadian Intellectual Property Office, mailing date Sep. 13, 2023, 3 pages.

* cited by examiner

300

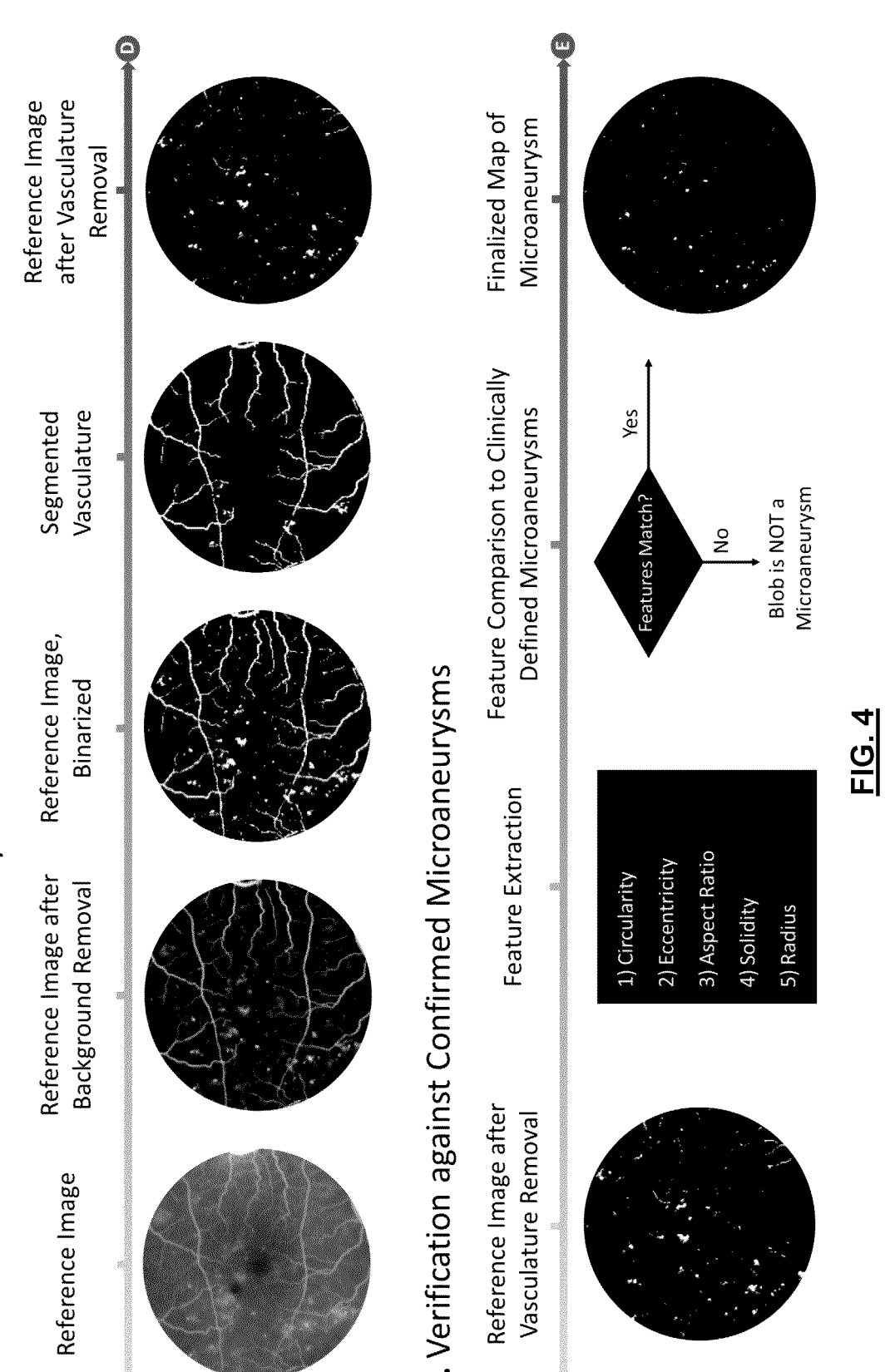

C. Detection of Potential Microaneurysms

Reference Image

Reference Image after Background Removal

Reference Image, Binarized

Segmented Vasculature

Reference Image after Vasculature Removal

D. Verification against Confirmed Microaneurysms

Reference Image after Vasculature Removal

Feature Extraction

1) Circularity
2) Eccentricity
3) Aspect Ratio
4) Solidity
5) Radius

Feature Comparison to Clinically Defined Microaneurysms

Features Match?

Yes

No

Blob is NOT a Microaneurysm

Finalized Map of Microaneurysm

FIG. 4

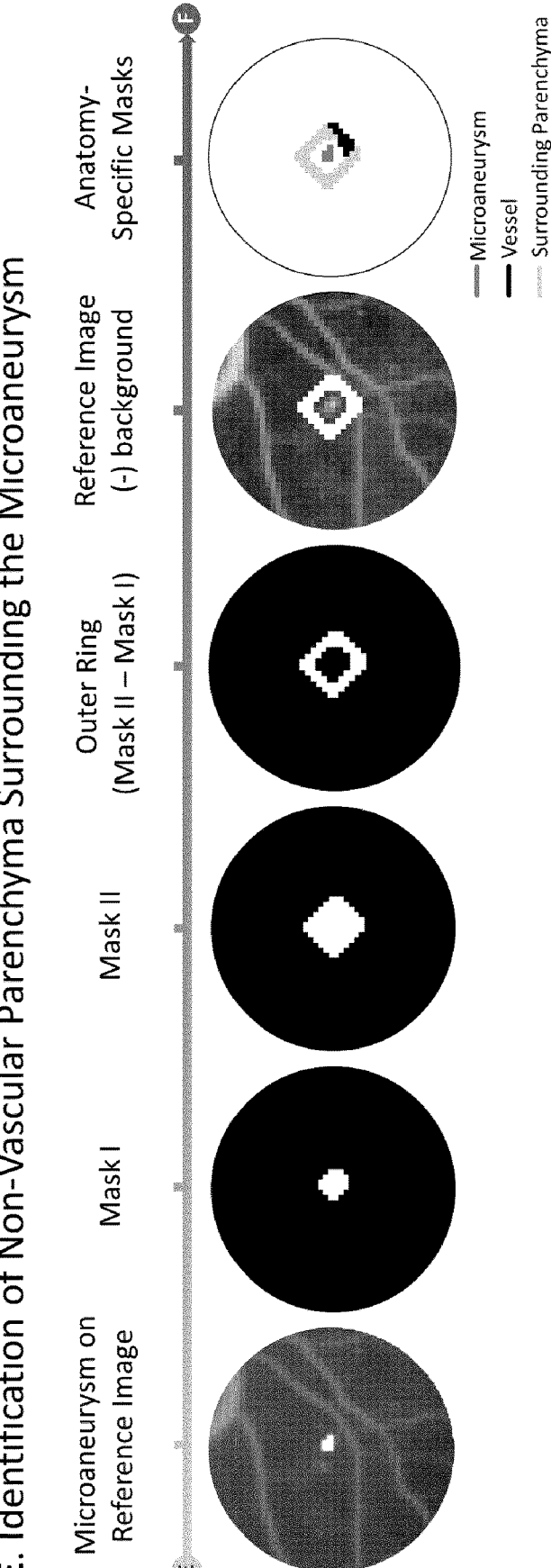
E. Identification of Non-Vascular Parenchyma Surrounding the Microaneurysm
Microaneurysm on Reference Image
Mask I
Mask II
Outer Ring (Mask II – Mask I)
Reference Image (-) background
Anatomy-Specific Masks
— Microaneurysm
— Vessel
— Surrounding Parenchyma
FIG. 5

○ = Non-Leaky Microaneurysm
● = Leaky Microaneurysm

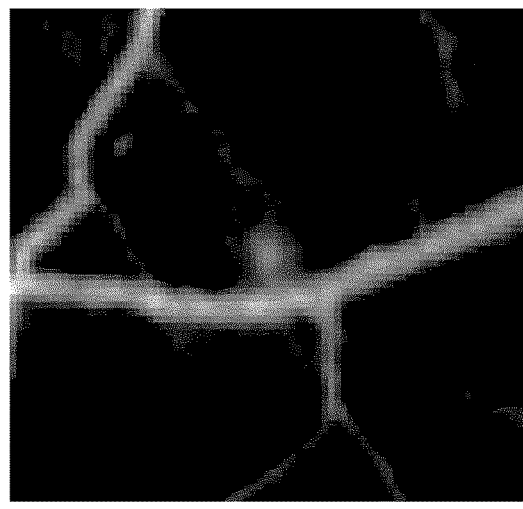
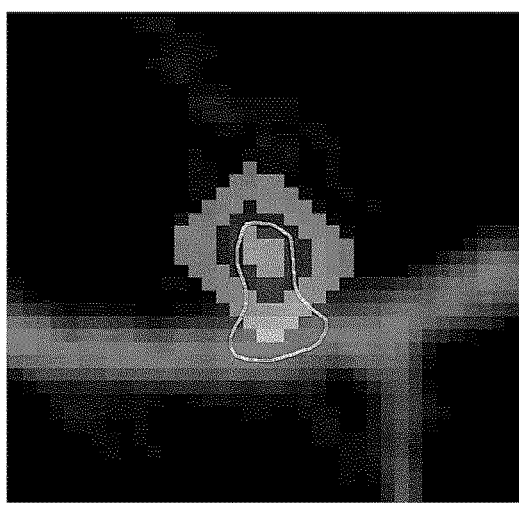
FIG. 13
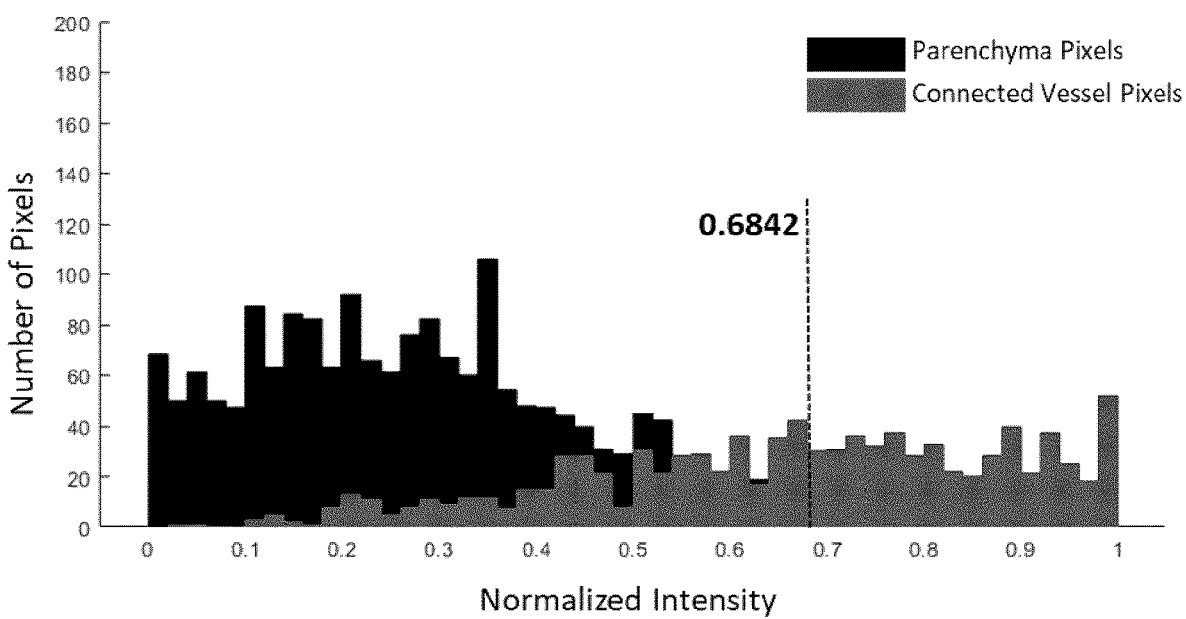
FIG. 14

Microaneurysms in controls, NPDR and PDR eyes

Percent of microaneurysms that are leaky

BRB leakage in controls, NPDR and PDR eyes

Ischemia in controls, NPDR and PDR eyes

SYSTEM AND METHOD FOR DETECTING AND CLASSIFYING RETINAL MICROANEURYSMS

CROSS-REFERENCE TO RELATED APPLICATION

This application is the U.S. national phase of PCT Application No. PCT/CA2022/050926 filed on Jun. 10, 2022, which claims the benefit of U.S. Provisional Patent Application No. 63/209,620 filed on Jun. 11, 2021, the disclosures of which are incorporated in their entirety by reference herein.

TECHNICAL FIELD

The following relates generally to data processing of medical imaging; and more specifically, to a system and method for detecting and classifying retinal microaneurysms.

BACKGROUND

Diabetes affects over 420 million people worldwide. Diabetic retinopathy is the most frequent microvascular complication of diabetes, with over 30% of patients at risk of partial vision loss, and ~10% at risk of severe visual impairment. Worldwide, diabetic retinopathy is a major cause of blindness and preventable vision impairment. Diabetic retinopathy is caused by dysfunction of retinal blood vessels, and the three hallmarks of the disease include: (i) the appearance of microaneurysms, small circular outpouchings protruding from retinal capillaries; (ii) leakage of the blood-retinal barrier (BRB); and (iii) retinal ischemia. The disease develops and progresses over several stages, with microaneurysms representing the earliest signs of vascular pathology, often appearing before the disease affects vision. As the disease progresses, the vasculature becomes leaky, allowing an influx of blood constituents into the retinal extracellular space. Vascular leakage can eventually result in the development of edema and vision loss. Importantly, BRB leakage and leaky microaneurysms are the main targets of treatments aimed at limiting vision loss. The appearance of ischemia (as a result of capillary occlusion) tends to represent an advanced stage of the disease, with irreversible damage to retinal neuronal-networks and irreparable loss of function. The most severe stage of the disease is characterized by the appearance of retinal neovascularization, and a transition from non-proliferative to proliferative diabetic retinopathy.

Clinical diagnosis of diabetic retinopathy generally includes fluorescein angiography (FA). FA allows the identification of: (i) microaneurysms, appearing as hyperfluorescent dots in the early phase of the scan; (ii) microaneurysm leakage, appearing as fluorescein extravasation in the late phase; (iii) BRB leakage, appearing as non-vascular tissue with fluorescein accumulation in the latent phase of the scan; and (iiii) retinal non-perfusion, appearing as tissue that fluorescein does not reach in the early phase of the scan. Another imaging modality that can be useful for the evaluation of diabetic retinopathy is optical coherence tomography (OCT). OCT can be used to capture vascular anatomy and blood flow, and to identify edema and ischemia. This approach generally has a relatively small scan-area. Moreover, this approach does not typically identify mild vascular leakage or mild edema. While microaneurysms can be detected in images acquired using FA, OCT, or color fundoscopy, FA is generally known to outperform the other two approaches in microaneurysm visualization.

SUMMARY

In an aspect, there is provided a method for detecting and classifying retinal microaneurysms, the method executed on a computing device, the method comprising: receiving a time sequence of fluorescein angiography input images; generating a binarized map of hyperfluorescent elements in the input images; detecting microaneurysms in the binarized map based on pixel connectivity for hyperfluorescent elements in the binarized map and by grading against a combination of morphological grading metrics; classifying each of the detected microaneurysms as leaky or not leaky; and outputting the classifications of the detected microaneurysms.

In a particular case of the method, classifying each of the detected microaneurysms as leaky or not leaky comprises: identifying an outer ring mask surrounding the detected microaneurysm; identifying parenchyma by applying the outer ring mask and determining fluorescence intensity; determining a rate of change of fluorescence intensity; and classifying the detected microaneurysm as leaky or not leaky based on the rate of change of the fluorescence intensity.

In another case of the method, classifying the detected microaneurysm as leaky or not leaky comprises classifying the detected microaneurysm as leaky where the rate of change is positive and classifying the detected microaneurysm as not leaky where the rate of change is negative or zero.

In yet another case of the method, the method further comprising performing rigid and non-rigid registration on the input images, comprising: for each input image, performing a rigid registration of the input image to a fixed image; and for each input image, performing a non-rigid registration of the image to the fixed image.

In yet another case of the method, rigid registration comprises performing feature detection and extraction to match features between the input image and the fixed image and removing non-matching features, and determining a geometric transformation for the matching features.

In yet another case of the method, non-rigid registration comprises filtering both the input image and the fixed image using a two-dimensional Gaussian blur function and subtracting the result from both original input images, respectively.

In yet another case of the method, non-rigid registration further comprises determining a displacement field that aligns the input image to the fixed image, determining a structural similarity (SSIM) index measures index for the registered image after application of the displacement field using additive displacement of pixel locations, and comparing the determined SSIM index to an SSIM index determined for the input image, and where the SSIM index is higher than the input image, the registered image is used, otherwise, the input image is used.

In yet another case of the method, the fixed image comprises a reference image as a maximum mean intensity image of the input images or the fixed image comprises a registered adjacent image.

In yet another case of the method, generating the binarized map further comprises labelling collections of connected pixels with equal values, determining regional properties for each of the collections of connected pixels, generating non-vasculature mask based on thresholds for the regional properties, and subtracting the non-vasculature mask from the binarized map.

In yet another case of the method, the method further comprising segmenting and removing blood vessels within the binarized map.

In yet another case of the method, segmenting and removing blood vessels comprises preprocessing the input images about the reference image using a combination of an adaptive histogram equalization, a median filter, and two-dimensional Gaussian filter blur functions.

In yet another case of the method, segmenting and removing blood vessels generates a filtered image determined as an input image subtracted by a first two-dimensional Gaussian filter, which is divided by the square root of a second two-dimensional Gaussian filter, the first two-dimensional Gaussian filter taking as input the input image and a standard deviation of the Gaussian distribution of 20, and the second two-dimensional Gaussian filter taking as input a square of the input image and a standard deviation of the Gaussian distribution of 4.

In yet another case of the method, segmenting and removing blood vessels within the binarized map comprises determining regional properties that comprise one or more of Perimeter, Area, Max Intensity, and Circularity, and wherein generating the non-vasculature mask is based on thresholds for the regional properties.

In yet another case of the method, the morphological grading metrics comprise one or more of Perimeter, Area, Eccentricity, Solidity, Minor Axis Length, and Major Axis Length.

In yet another case of the method, the outer ring mask is generated by determining a first dilated mask for each detected microaneurysm, determining a second dilated mask for each detected microaneurysm with a larger radius than the first dilated mask, and subtracting the first dilated mask from the second dilated mask.

In yet another case of the method, the method further comprising performing min-max normalization on pixels in the outer ring, and determining candidate connected vessel pixels as pixels with a fluorescence intensity greater than a predetermined threshold.

In yet another case of the method, identifying the parenchyma comprises determining a parenchyma slope using an average intensity vector, and wherein determining the rate of change of fluorescence intensity comprises: determining an endpoint of the parenchyma average intensity vector, determining a smaller parenchyma vector comprising fluorescence intensity determination of the parenchyma between a maximum fluorescence intensity and a defined period post-maximum fluorescence intensity, determining a starting point from the smaller parenchyma average intensity vector as a time when the fluorescence intensity drops below a defined intensity value, and determining a slope of the vector as the rate of change of fluorescence intensity.

In yet another case of the method, the method further comprising determining perfusion as a rate of enhancement for a period occurring between choroidal flush and arterio-venous stages, wherein identifying choroidal flush comprises identifying an input image with a presence of dye and identifying arteriovenous stages comprises identifying an input image with maximal fluorescence, applying linear regression to enhancement for each pixel, and determining non-ischemic pixels as pixels containing positive slopes and ischemic pixels as pixels containing zero or negative slopes.

In yet another case of the method, the method further comprising determining regional quantities for at least one of the detected microaneurysms using a circular grid overlaid on one of the input images or the reference image, the circular grid proportional in size to the width of an optic disc in the input images or the reference image, the regional quantities comprising one or more of leaky and not leaky information, blood-retinal barrier leakage, perfusion, ischemia, early-enhancement slope, and latent-enhancement slope.

In another aspect, there is provide a system for detecting and classifying retinal microaneurysms, the system comprising a processing unit and memory storage, the processing unit in communication with the memory storage and configured to execute: a preprocessing module to receive a time sequence of fluorescein angiography input images, and to generate a binarized map of hyperfluorescent elements in the input images; a detection module to detect microaneurysms in the binarized map based on pixel connectivity for hyperfluorescent elements in the binarized map and by grading against a combination of morphological grading metrics; a classification module to classify each of the detected microaneurysms as leaky or not leaky; and an output module to output the classifications of the detected microaneurysms.

In a particular case of the system, classifying each of the detected microaneurysms as leaky or not leaky comprises: identifying an outer ring mask surrounding the detected microaneurysm; identifying parenchyma by applying the outer ring mask and determining fluorescence intensity; determining a rate of change of fluorescence intensity; and classifying the detected microaneurysm as leaky or not leaky based on the rate of change of the fluorescence intensity.

In another case of the system, classifying the detected microaneurysm as leaky or not leaky comprises classifying the detected microaneurysm as leaky where the rate of change is positive and classifying the detected microaneurysm as not leaky where the rate of change is negative or zero.

In yet another case of the system, the preprocessing module further performs rigid and non-rigid registration on the input images, comprising: for each input image, performing a rigid registration of the input image to a fixed image; and for each input image, performing a non-rigid registration of the image to the fixed image.

In yet another case of the system, rigid registration comprises performing feature detection and extraction to match features between the input image and the fixed image and removing non-matching features, and determining a geometric transformation for the matching features.

In yet another case of the system, non-rigid registration comprises filtering both the input image and the fixed image using a two-dimensional Gaussian blur function and subtracting the result from both original input images, respectively.

In yet another case of the system, non-rigid registration further comprises determining a displacement field that aligns the input image to the fixed image, determining a structural similarity (SSIM) index measures for the registered image after application of the displacement field using additive displacement of pixel locations, and comparing the determined SSIM index to an SSIM index determined for the input image, and where the SSIM index is higher than the input image, the registered image is used, otherwise, the input image is used.

In yet another case of the system, the fixed image comprises a reference image as a maximum mean intensity image of the input images or the fixed image comprises a registered adjacent image.

In yet another case of the system, generating the binarized map further comprises labelling collections of connected pixels with equal values, determining regional properties for each of the collections of connected pixels, generating a non-vasculature mask based on thresholds for the regional properties, and subtracting the non-vasculature mask from the binarized map.

In yet another case of the system, the detection module further segments and removes blood vessels within the binarized map.

In yet another case of the system, segmenting and removing blood vessels comprises preprocessing the input images about the reference image using a combination of an adaptive histogram equalization, a median filter, and two-dimensional Gaussian filter blur functions.

In yet another case of the system, segmenting and removing blood vessels generates a filtered image determined as an input image subtracted by a first two-dimensional Gaussian filter, which is divided by the square root of a second two-dimensional Gaussian filter, the first two-dimensional Gaussian filter taking as input the input image and a standard deviation of the Gaussian distribution of 20, and the second two-dimensional Gaussian filter taking as input a square of the input image and a standard deviation of the Gaussian distribution of 4.

In yet another case of the system, segmenting and removing blood vessels within the binarized map comprises determining regional properties that comprise one or more of Perimeter, Area, Max Intensity, and Circularity, and wherein generating the non-microaneurysm mask is based on thresholds for the regional properties.

In yet another case of the system, the morphological grading metrics comprise one or more of Perimeter, Area, Eccentricity, Solidity, Minor Axis Length, and Major Axis Length.

In yet another case of the system, the outer ring mask is generated by determining a first dilated mask for each detected microaneurysm, determining a second dilated mask for each detected microaneurysm with a larger radius than the first dilated mask, and subtracting the first dilated mask from the second dilated mask.

In yet another case of the system, the classification module further performs min-max normalization on pixels in the outer ring, and determines candidate connected vessel pixels as pixels with a fluorescence intensity greater than a predetermined threshold.

In yet another case of the system, identifying the parenchyma comprises determining a parenchyma slope using an average intensity vector, and wherein determining the rate of change of fluorescence intensity comprises: determining an endpoint of the parenchyma average intensity vector, determining a smaller parenchyma vector comprising fluorescence intensity determination of the parenchyma between a maximum fluorescence intensity and a defined period post-maximum fluorescence intensity, determining a starting point from the smaller parenchyma average intensity vector as a time when the fluorescence intensity drops below a defined intensity value, and determining a slope of the vector as the rate of change of fluorescence intensity.

In yet another case of the system, the detection module further determines perfusion as a rate of enhancement for a period occurring between choroidal flush and arteriovenous stages, wherein identifying choroidal flush comprises identifying an input image with a presence of dye and identifying arteriovenous stages comprises identifying an input image with maximal fluorescence, applying linear regression to enhancement for each pixel, and determining non-ischemic pixels as pixels containing positive slopes and ischemic pixels as pixels containing zero or negative slopes.

In yet another case of the system, the classification module determines regional quantities for at least one of the detected microaneurysms using a circular grid overlaid on one of the input images or the reference image, the circular grid proportional in size to the width of an optic disc in the input images or the reference image, the regional quantities comprising one or more of leaky and not leaky information, blood-retinal barrier leakage, perfusion, ischemia, early-enhancement slope, and latent-enhancement slope.

These and other aspects are contemplated and described herein. It will be appreciated that the foregoing summary sets out representative aspects of systems and methods to assist skilled readers in understanding the following detailed description.

BRIEF DESCRIPTION OF THE DRAWINGS

The features of the invention will become more apparent in the following detailed description in which reference is made to the appended drawings wherein:

FIG. 4 illustrates an example of detection of microaneurysms and outputting of a map of detected microaneurysms, in accordance with the method of FIG. 2;

FIG. 5 illustrates an example of identification of non-vascular parenchyma using applied masks, in accordance with the method of FIG. 2;

FIG. 13 illustrates an example of pixels within an outer ring of a microaneurysm, in accordance with the method of FIG. 2;

FIG. 14 illustrates a histogram showing pixels within a traced region identified as connected vessel pixels, while those in the rest of the outer ring were identified as parenchyma pixels, with median of the connected vessel pixels taken as an intensity threshold;

DETAILED DESCRIPTION

Figure 1:
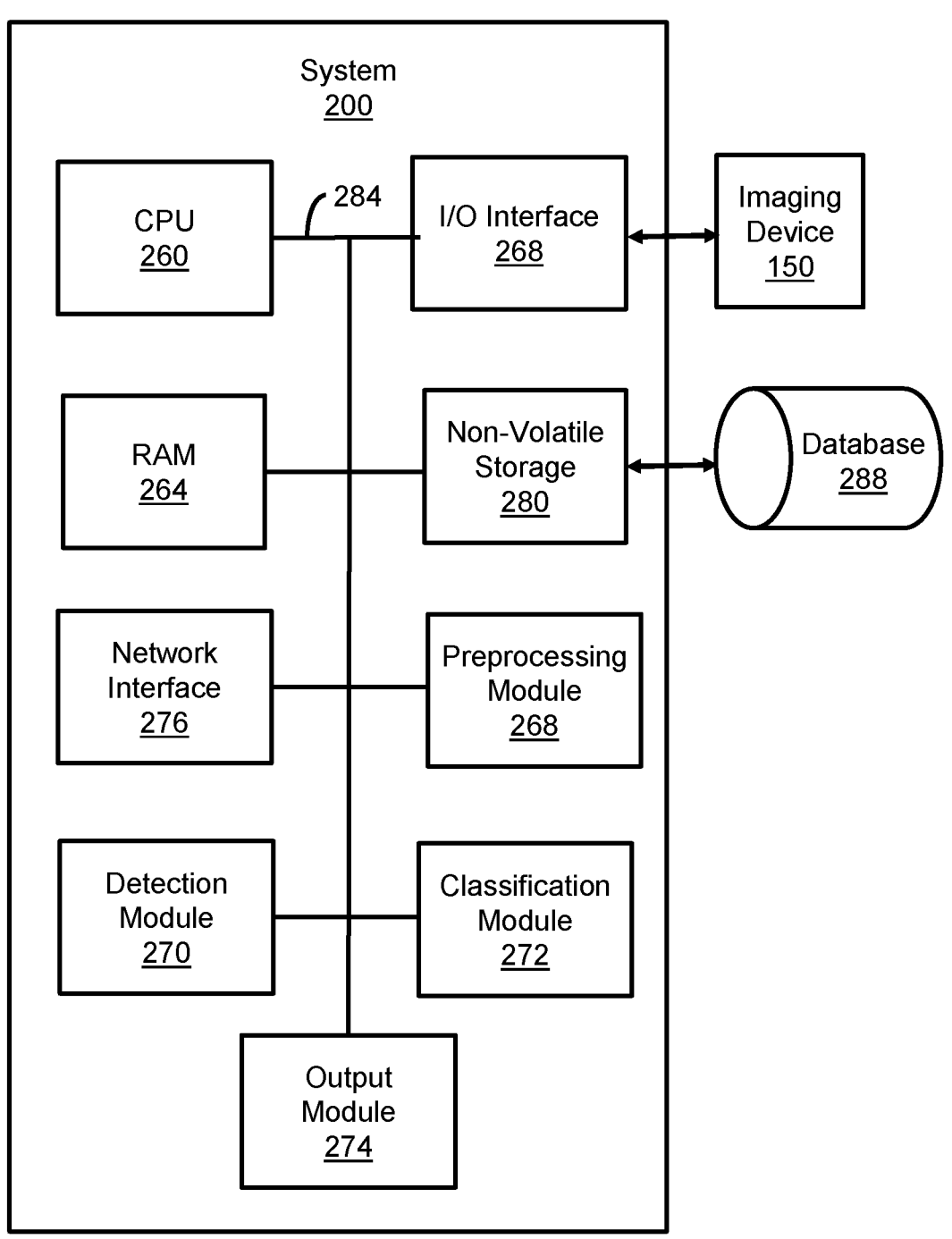
FIG. 1 is a schematic diagram of a system for detecting and classifying retinal microaneurysms, in accordance with an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to data processing of medical imaging; and more specifically, to a system and method for detecting and classifying retinal microaneurysms. Ophthalmologists generally rely on manual inspection of fluorescein angiography (FA) images, in which microaneurysms appear as small hyperfluorescent dots. Manual inspection of images can be a time-consuming task for the ophthalmologist. Moreover, grading whether microaneurysms are leaky or non-leaky requires even more time and effort as it necessitates the ophthalmologist to evaluate, simultaneously, an image from the early and late phases of the FA scan. Advantageously, the present embodiments provide a technical approach for automatically detecting microaneurysms from FA images that alleviates the substantial challenges of other approaches.

The present embodiments provide ophthalmologists, and other users, an approach that permits a more informed diagnosis of early-stage diabetic retinopathy. For example, providing classification of microaneurysms (a type of retinal lesion) as leaky or non-leaky. This classification further enhances the ophthalmologist's decision-making as to which microaneurysms should be targeted for treatment. Embodiments of the present disclosure provide an approach for automatic detection of microaneurysms, and thus, can be used to test for biomarkers for disease severity, specifically at early stages, before the appearance of clinically detected blood-retina-barrier (BRB) leakage, ischemia and/or edema. The ability to accurately detect diseases, for example, before the development of visual impairment, allows for preventative intervention with eyesight-preserving treatment.

In a particular approach, time series analysis can be performed on sets of FA images to produce maps of BRB leakage, perfusion, and blood flow. In some cases, a processing pipeline can include preprocessing, binarization, vessel removal, feature extraction, classification of each hyperfluorescent element into a microaneurysm or not a microaneurysm, and classification of each detected microaneurysm into a leaky microaneurysm or not a leaky microaneurysm. Preprocessing can include removal of background illumination. Binarization of the filtered image can be performed using an intensity threshold. Vessel removal can be performed by segmenting out blood vessels. Feature extraction can be performed using shape analysis (for example, circularity, solidity, aspect ratio, eccentricity, diameter/radius, and the like). Classification can be performed using either thresholds or a classifier (for example, artificial neural network (ANN), support vector machine (SVM), convolutional neural network (CNN), or the like).

Other approaches can generally detect microaneurysms by merely determining microaneurysm turnover rate (number of microaneurysms that appear and disappear between patient visits) or by classifying the eye as either "healthy" (no microaneurysms) or "not healthy" (≥1 microaneurysms). However, such approaches are not particularly accurate and do not provide as much useable information to the ophthalmologist's decision-making as to which microaneurysms should be targeted for treatment. Some approaches can utilize shape metrics or geometric properties to classify elements within a binarized image as a microaneurysm or not; however, it is only used to generally detect microaneurysms and output the number of detected microaneurysms. Further approaches can utilize an outer ring for segmentation of microaneurysms in color fundus; where the outer ring around the microaneurysm is used to evaluate contrast differences between the candidate microaneurysm and its surroundings. In such approaches, if the difference is large enough, the candidate is considered a microaneurysm. However, under such approaches, using an outer ring purely for segmentation provides only a rough estimation for determinations of microaneurysms, and is not particularly accurate.

FIG. 1 illustrates a schematic diagram of a system 200 for detecting and classifying retinal microaneurysms, in accordance with an embodiment. As will be appreciated, while the system 200 is illustrated as being a single physical computer, it can alternatively be two or more computers acting cooperatively to provide the functionality described. As shown, the system 200 has a number of physical and logical components, including a central processing unit ("CPU") 260, random access memory ("RAM") 264, an input/output ("I/O") interface 268, a network interface 276, non-volatile storage 280 in communication with a database 288, and a local bus 284 enabling the CPU 260 to communicate with the other components. The CPU 260 executes an application for detecting and classifying retinal microaneurysms. The functionality of an application for detecting and classifying retinal microaneurysms is described below in greater detail. The RAM 264 provides relatively responsive volatile storage to the CPU 260. The I/O interface 268 enables a user to interact with the system 200 via in input device and/or an output device. The network interface 276 permits wired or wireless communication with other systems. The non-volatile storage 280 stores computer readable instructions for implementing the application, as well as any services, operating systems, or data used by the application. During operation of the system 200, the computer readable instructions may be retrieved from the non-volatile storage 280 and placed in the RAM 264 to facilitate execution. In other embodiments, any operating system, programs, or instructions can be executed in hardware, specialized microprocessors, logic arrays, or the like. An imaging device 150, for example, a fluorescein angiograph imaging device, may be linked to the system 200 to provide the input images. In other cases, the input images can be retrieved via the database 288, the network interface 276, or the input/output ("I/O") interface 268.

In an embodiment, the CPU 260 can be configured to execute the application via executing a number of conceptual modules; such as a preprocessing module 268, a detection module 270, a classification module 272, and an output module 274. In further cases, the functions of the various modules can be combined or performed by other modules.

Figure 2:
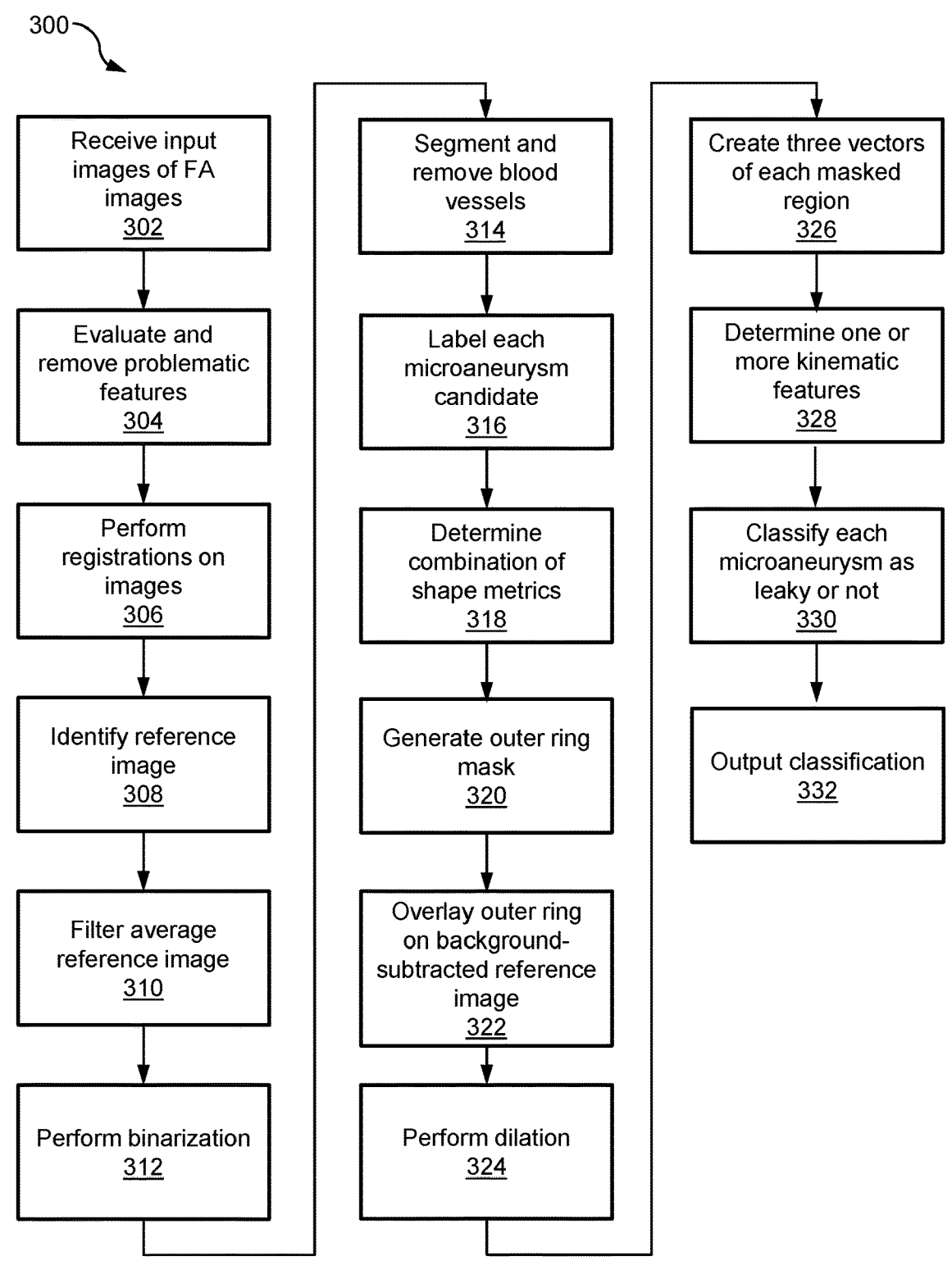
FIG. 2 is a flowchart for a method for detecting and classifying retinal microaneurysms, in accordance with an embodiment.

Turning to FIG. 2, a method for detecting and classifying retinal microaneurysms 300, according to an embodiment, is shown. At block 302, the preprocessing module 268 receives the input images. The input images consist of FA scans of a patient's eye fundus.

At block 304, the preprocessing module 268, in some cases, evaluates the input images for problematic features; for example, overexposure, opposite eye, occlusions, inconsistent zoom, extreme rotations, blurring, blinking, and the like. Problematic images are removed and illumination artifacts within the scan are corrected where possible; for example, gain or global illumination correction.

At block 306, the preprocessing module 268 performs a combination of rigid and non-rigid registrations on the evaluated input images to align the images for temporal, pixel-wise analysis.

For alignment, first a reference image is identified as a maximum mean intensity image within the FA scan. In most cases, registration operates outwardly, starting from the location of the reference image. The registration process can be divided into two separate streams: (1) registration of the early-phase images, and (2) registration of the late-phase images.

For each image to be registered, two rigid registration attempts can be conducted. This includes (1) a rigid registration of the selected image to the reference image, and (2) a registration of the selected image to the already registered adjacent image. Specific to the registration of late-phase images, the adjacent image is computed from the mean of all prior registered late-phase images.

Within each rigid registration instance, the image to be registered can be referred to as a "moving image", and the reference image or registered adjacent image as a "fixed image". Given a moving and fixed image, an adaptive histogram equalization, using, for example, a normalized contrast enhancement limit of 0.01, can be applied to enhance local contrast and edges. Feature detection and extraction can be performed using, for example, ORB, AKAZE, or a similar local feature detector and descriptor. Unique features can be matched between the moving and fixed images and outlying features can be removed (for example, using an M-estimator SAmple Consensus (MSAC) algorithm). A geometric transformation can be estimated from the remaining features and applied via interpolation of the moving image's pixels.

Structural similarity (SSIM) index measures can be determined for both registration attempts and compared to one another. The SSIM index for any given registration attempt is calculated using two input images: (1) the registered image, and (2) the image being registered to. If a registration attempt failed to produce a geometric transformation (e.g., less than 4 matched points), a SSIM index of zero is recorded for that instance. The result with the greater SSIM index is selected as the best rigid registration, provided that the transformation's rotation and scale are within an acceptable range (for example, $-13.6995° \leq$ Rotation$\leq 13.6995°$, $0.9680 \leq$ Scale$\leq 1.0331$). For the early phase, if either the rotation or scale are outside the acceptable range, the unregistered image is used. Conversely, for the late phase, the image is rejected and the next image in the sequence is processed.

The best rigid-registered image can then be processed via a non-rigid registration method (e.g., Demon's Algorithm) to correct for local distortions. For non-rigid registration, the adjacent image can be used as the "fixed image". Both the moving and fixed images can be filtered using a two-dimensional Gaussian (where $\mu=0$, $\sigma=20$, and a covariance matrix comprising of $\sigma^2$ along diagonal entries and 0 along off-diagonal entries) blur function and subtracted from the original images. This process removes uneven background illumination and leaves behind anatomical features; for example, blood vessels, small lesions, lasers scars, and the optic disc. Utilizing the Demon's Algorithm, a displacement field can be estimated that aligns the moving image to the fixed image. The displacement field can be applied to the moving image via additive displacement of its pixel locations. A SSIM index is calculated for the result of the registration and compared to the SSIM index of the unregistered image. If the SSIM index is higher than the unregistered image, the registered image is used. Otherwise, the image without non-rigid registration applied (i.e. the best rigid-registered image) is used.

The preprocessing module 268 can then preprocess each successive image within the sequence until all images are registered (n−1 for early-phase, and n+1 for late-phase registration).

Figure 3:
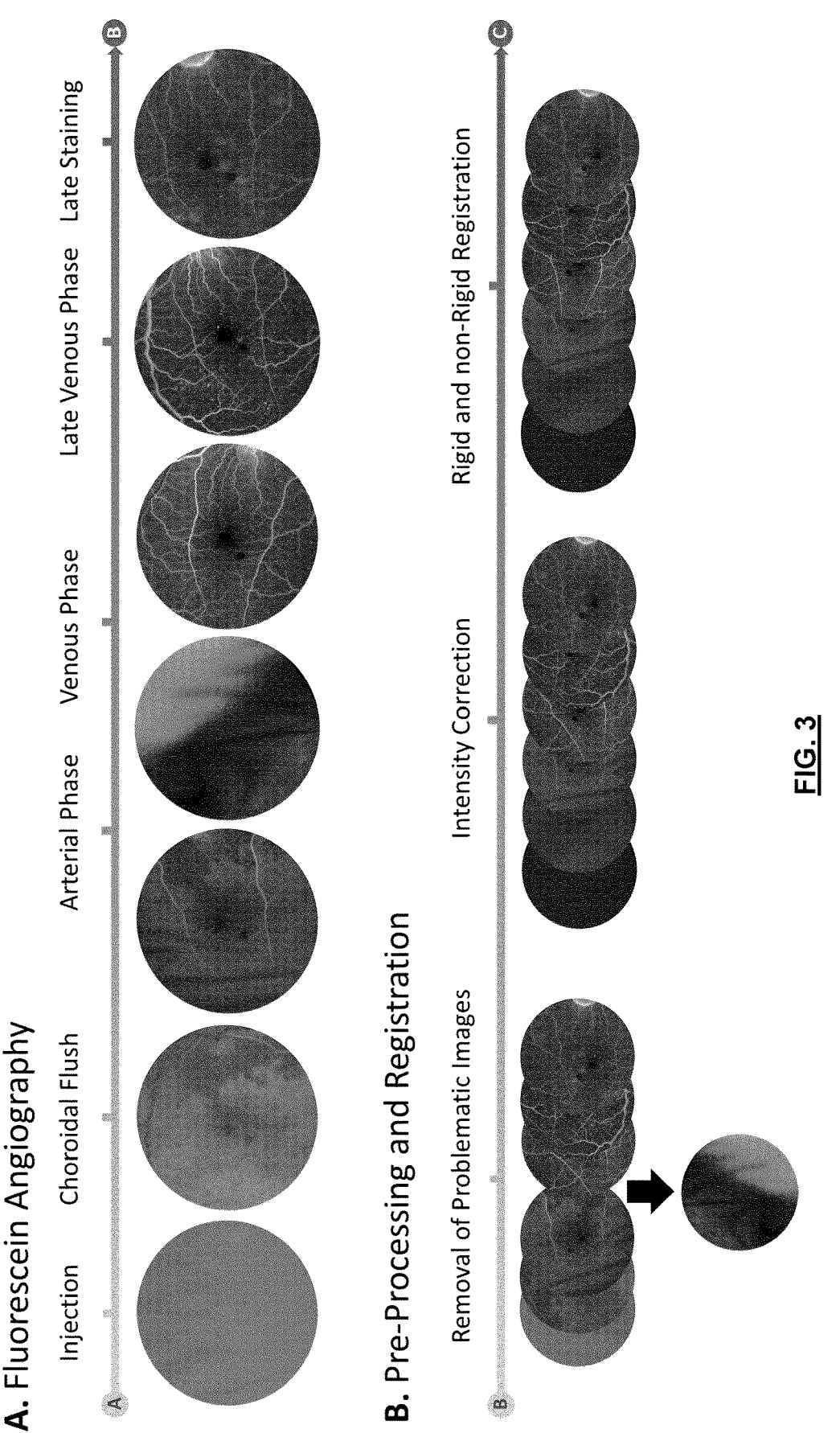
FIG. 3 illustrates an example of a preprocessing timeline, in accordance with the method of FIG. 2.

An example of the preprocessing performed by the preprocessing module 268 is illustrated in FIG. 3.

To segment microaneurysms from a sequence of FA images, their morphology should be characterized. In FA images, microaneurysms are visible as hyperfluorescent dots in the early phase of the scan. These hyperfluorescent dots are indicative of microaneurysm structure; a small saccular outpouching that involve capillaries. To extract hyperfluorescent dots from an FA scan, the detection module 270, at block 308, identifies a reference image. The reference image is selected as a maximum mean intensity image in the sequence of FA images. This reference image provides excellent contrast between the background tissue and structural features in the retina. In some cases, to enhance the reference image further, the detection module 270 can also average the reference image with the image prior and image after in the FA scan to create an averaged reference image.

At block 310, the detection module 270 filters the averaged reference image, for example, using a two-dimensional Gaussian (where μ=0, σ=20, and a covariance matrix comprising of $\sigma^2$ along diagonal entries and 0 along off-diagonal entries) blur function, and subtracts the result from the original averaged reference image. This filtering and subtraction can separate the smaller hyperfluorescent features in the retina from the background tissue. At block 312, the detection module 270 performs binarization on hyperfluorescent features in the filtered images using an intensity threshold; for example, an intensity of threshold of 25 (where intensity values are in the range of 0 to 255). At block 314, the detection module 270 segments and removes the blood vessels within the binarized map.

Blood vessel segmentation is performed by the detection module 270 on a set of images about the reference image; for example, from −5 seconds to +25 seconds about the reference image. Each image can be filtered via, for example, a combination of adaptive histogram equalization with a normalized contrast enhancement limit of 0.01, a two-dimensional median filter to reduce noise, and saturation of the bottom 1% and top 1% of pixels to further enhance contrast. The detection module 270 filters the images, for example, via a two-dimensional Gaussian filter (where μ=0, σ=20, and a covariance matrix comprising of $\sigma^2$ along diagonal entries and 0 along off-diagonal entries) blur function and subtracts the result from the original images. Additionally, the square of each image can be processed via a second Gaussian filter (where μ=0, σ=4, and a covariance matrix comprising of $\sigma^2$ along diagonal entries and 0 along off-diagonal entries) and the square root can be calculated. The result of the first Gaussian operation can then be divided by the result of the second. This process is illustrated by the following mathematical equation.

$$I_{filtered} = \frac{I_1 - g(I_1, 20)}{\sqrt{g(I_1^2, 4)}}$$

where g(x,σ) is the two-dimensional Gaussian filter with inputs x (an image) and σ (the standard deviation of the Gaussian distribution)

$I_1$ is the input image $I_{filtered}$ is the result of the operation.

Each image is binarized utilizing, for example, Otsu's threshold. Otsu's threshold is determined by minimizing the intraclass variance between light and dark pixels. Lone pixels in the binarized maps are removed and a two-dimensional median filter (3×3 kernel) is applied. Individual blobs can be labelled, where a blob includes a collection of 8-point connected pixels consisting of equal values. Individual blobs are numerically labelled based on the 8-point pixel connectivity (i.e., a pixel with a value of 1 is considered connected to an adjacent pixel if it contains a value of 1), and the following regional properties are determined for each blob:

Perimeter ($P_{blob\_px}$)

Area ($A_{blob\_px}$)

Max Intensity ($MaxInt_{blob}$)

where max intensity is the maximal intensity value within the original, unprocessed image encompassed by the labelled blob.

For each blob, their circularity is calculated using the following equation:

$$c_{blob} = \frac{P_{blob\_px}{}^2}{4\pi A_{blob\_px}}$$

Any blobs with a circularity value less than a predetermined value (e.g., 17) or a max intensity below a predetermined value (e.g., 10) are used to create a non-vasculature mask. This mask contains blobs that are too round or dark to be a vessel; blood vessels are expected to appear as bright, thin objects within the FA scan. Holes within the non-vasculature mask (e.g., pixels with a value of 0) are morphologically filled (4-pixel connectivity). The non-vasculature mask is then subtracted from the original binarized map. The result can be processed via morphological bridging (for example, a process that sets 0-value pixels to 1 if it has two or more non-zeros neighboring pixels) multiple times (e.g., five times). All the processed maps can then be summed together to construct a blood vessel map.

Binarization advantageously allows the detection module 270 to differentiate between non-microaneurysm (non-hyperfluorescent blob) and candidate microaneurysms (hyperfluorescent blob) within the retina. Additionally, it allows the detection module 270 to isolate the boundaries of microaneurysm candidates and compute shape metrics (as described herein).

The output of the segmentation and removal is a binarized map of hyperfluorescent elements in the averaged reference image. At block 316, each microaneurysm candidate is individually labelled by the detection module 270, and one or more of the following regional properties are determined:

Perimeter ($P_{Candidate\_px}$)

Area ($A_{Candidate\_px}$)

Eccentricity ($E_{Candidate}$)

Solidity ($S_{Candidate}$)

Minor Axis Length ($MinorL_{Candidate\_px}$)

Major Axis Length ($MajorL_{Candidate\_px}$)

Microaneurysm candidates can be labelled based on pixel connectivity. Non-zero pixels with neighboring (8-point connectivity) non-zero pixels can be considered part of the same blob. A set of connected non-zero pixels can be numerically labelled in a separate map to identify individual blobs (e.g., pixels with a value of 23 belong to microaneurysm candidate #23). This process is performed for each pixel until a labelled map is generated.

At block 318, to classify microaneurysm candidates as either a microaneurysm or not, the detection module 270 determines a combination of shape metrics. In a particular case, the shape metrics can include certain structural features: (1) a circular shape (whereas blood vessel fragments are generally oblong); (2) solid/compact; (3) less than 125 μm in diameter; (4) unity aspect ratio (whereas blood vessels generally do not); and (5) low eccentricity. In some cases, to avoid classifying noise or potentially non-microaneurysm blobs as microaneurysms, a lower limit can be used (for example, ~10 μm) in the evaluation of a candidate's radius. In these cases, morphological grading metrics for microaneurysm candidates are:

Circularity ($C_{Candidate}$)

Eccentricity ($E_{Candidate}$)

Solidity ($S_{Candidate}$)

Radius ($R_{Candidate\_\mu m}$)

Unity Aspect Ratio ($AR_{Candidate}$)

Using the regional properties, the detection module 270 determines the shape metrics, such as those listed above. Example thresholds and methodologies for determining each of the shape metrics are detailed herein. Note, the term "_px" represents a value measured in the number of pixels, and "_μm" represents the value measured in microns.

Circularity ($C_{Candidate}$)

Circularity is a measure relating an object's perimeter to its area. This ratio is indicative of how circular a given shape is. For the present shape metric, circularity can be calculated using:

$$c_{Candidate} = \frac{P^2_{Candidate\_px}}{4\pi A_{Candidate\_px}}$$

As such, a perfectly circular object will have a circularity of 1, whereas a non-circular object will have a circularity greater than 1. Since microaneurysms are small in a FA scan, this results in pixelated objects rather than smooth profiles, a suitable threshold should be used; for example, a threshold of 1.3. This will compensate for error as a result of image digitization.

Eccentricity ($E_{Candidate}$)

Eccentricity is a measure relating the distance between foci of an ellipse to the length of the major axis. A circle has an eccentricity of 0, whereas a line segment will have an eccentricity of 1. Eccentricity is used as a shape metric to remove vessel fragments and other blobs that are not round (e.g., blood vessel fragments). A suitable eccentricity threshold should be used; for example, a threshold of less than 0.9.

Solidity ($S_{Candidate}$)

Solidity is a measure relating the proportion of pixels within a blob to that within its convex hull. Objects with gaps and holes in their structure will have a solidity approaching 0, whereas compact objects will have a solidity of 1. Since microaneurysms are outpouchings that protrude from blood vessels, they generally do not have gaps or holes. A suitable solidity threshold should be used; for example, a threshold 0.9.

Radius ($R_{Candidate\_\mu m}$)

In some cases, to determine a measured radius of each candidate, the detection module 270 can relate the area of the optic disc within the reference image to the candidate being assessed. To calculate a candidate's radius, the detection module 270 can derive a ratio using a known average width and height measurements of an optic disc, for example, 1670 μm and 1900 μm, respectively. The detection module 270 then determines an equivalent optic disc radius by equating the area of an ellipse to the area of a circle. From this determination, the detection module 270 can derive an equivalent average optic disc radius, for example, 891 μm. Using the equivalent average optic disc radius, the detection module 270 can determine the radius of a microaneurysm using:

$$R_{Candidate\_\mu m} = \frac{891\ \mu m}{R_{opticDisc\_px}} \times \sqrt{\frac{A_{Candidatepx}}{\pi}}\ (\mu m)$$

where $R_{OpticDisc\_px}$ is the optic disc radius of the reference image measured in pixels. A microaneurysm will have a measured radius within a suitable range; for example, between 10 μm and 62.5 μm. This suitable range is used to remove non-microaneurysm candidates.

Aspect Ratio ($AR_{Candidate}$)

Using the major and minor axis lengths of each candidate, the detection module 270 can determine the aspect ratio using:

$$AR_{Candidate} = \frac{MajorL_{Candidate\_px}}{MinorL_{Candidat\_px}}$$

Since microaneurysms are round, they will have an aspect ratio approaching 1.0. A suitable threshold should be used accordingly; for example, a threshold of 2.0.

In summary, the shape metrics grading criteria for each blob in the above examples is as follows, where any blobs that do not meet these criteria are rejected and not considered a microaneurysm:

$$C_{Candidate} < 1.3$$

$$E_{Candidate} < 0.9$$

$$S_{Candidate} > 0.9$$

$$10\ \mu m < R_{Candidate\_\mu m} < 62.5\ \mu m$$

$$AR_{Candidate} \leq 2.0$$

Figure 11:
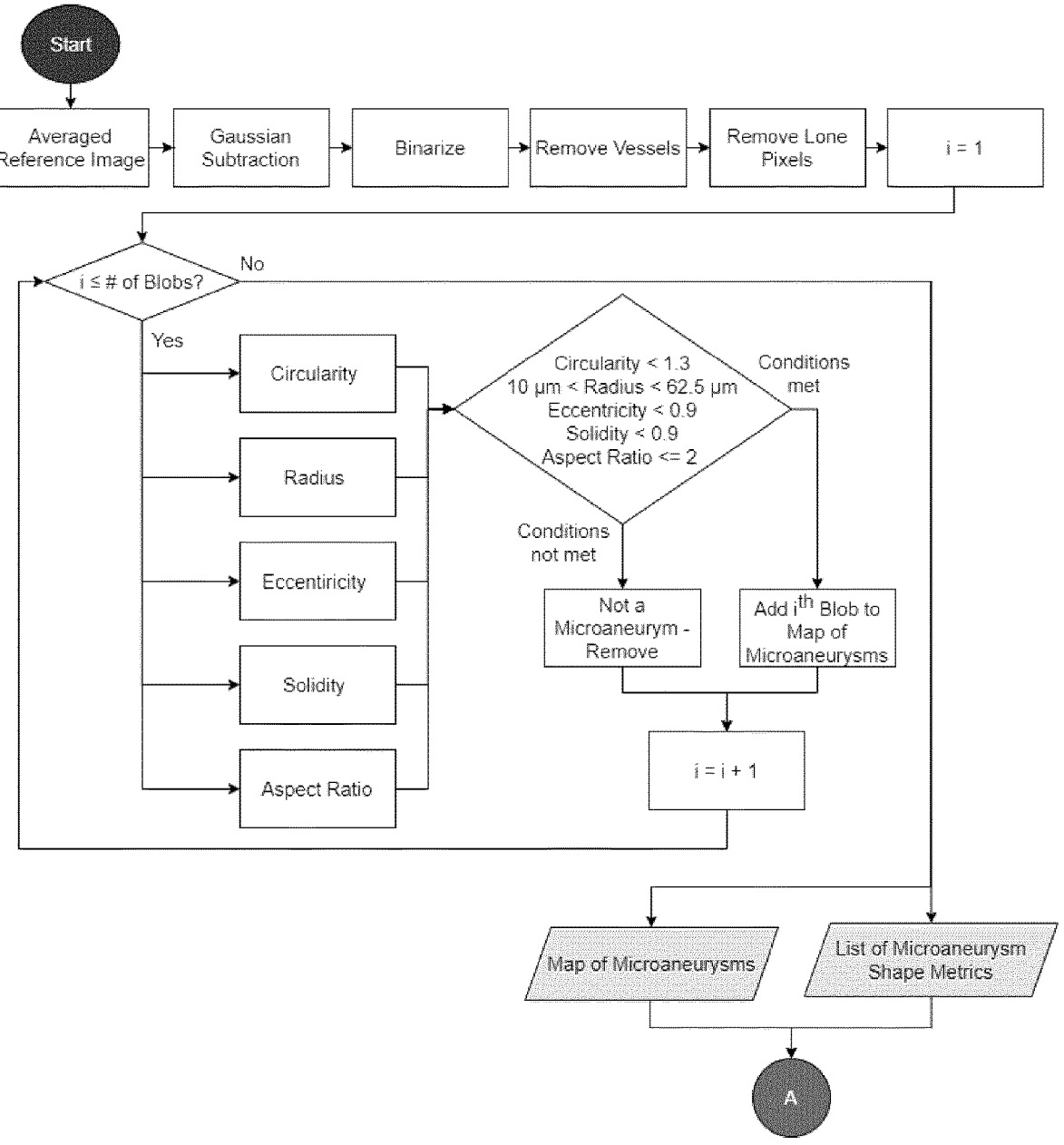
FIG. 11 illustrates a flowchart of an example approach for detecting microaneurysms in accordance with the method of FIG. 2.

An example of the detection performed by the detection module 270 is illustrated in FIG. 4. FIG. 11 illustrates a flowchart of an example approach for detecting microaneurysms in accordance with the present embodiments.

To evaluate if a microaneurysm is either leaky or non-leaky, at block 320, the classification module 272 generates an outer ring mask to evaluate parenchyma surrounding the detected microaneurysms. In an embodiment, the outer ring mask can be generated by, first, having a small, dilated mask applied on a particular detected microaneurysm; for example, each detected microaneurysm receives a 2-pixel boundary thickening. Then, a large, dilated mask of the detected microaneurysm is generated; for example, each detected microaneurysm receives a 5-pixel boundary thickening. Finally, the small mask is subtracted from the large mask; for example, creating 3-pixel width rings around each detected microaneurysm with a 2-pixel gap.

At block 322, for each microaneurysm, the classification module 272 overlays the respective outer ring on the background-subtracted reference image to identify which pixels correspond to the microaneurysm's connected vessel. Pixels in the outer ring are then min-max normalized and pixels with a value greater than a suitable threshold (for example, 0.6842) are considered a candidate connected vessel pixel. The present inventors determined that pixels with relatively high intensity in the outer mask will correspond to the connected vessel of the detected microaneurysm as they tend to contain higher concentrations of fluorescein dye than the surrounding parenchyma.

In an example, as illustrated in FIGS. 13 and 14, the threshold can be determined manually by utilizing the background-subtracted image and having the pixels within the outer ring of several microaneurysms manually identified by a user. Pixels within traced regions (common to the outer ring as well) can be identified as connected vessel pixels, while those in the rest of the outer ring can be identified as parenchyma pixels. The resulting intensities can then be plotted on a histogram and the median of the connected vessel pixels taken as the intensity threshold.

In some cases, the classification module 272 passes the pixels identified as candidate vessel pixels through a median filter (3×3 kernel) to suppress noise. At block 324, the classification module 272 performs dilation, for example, using two flat line structural elements measuring 3 pixels in length with one at 0° and the other at 90°. As a result, there are three individual masks: the microaneurysm mask, the connected vessel mask, and the parenchyma mask. An example of the three masks is shown in FIG. 5.

Dilation allows for expansion of the profile of detected microaneurysms. Specifically, the flat line structural elements are used to probe the binary map of microaneurysms and record the same value located at its origin across the length of the structural element. In some cases, pixels with a value of 0 are not dilated. This results in an expansion of the underlying shape across the length and direction of the structural element.

For the vessel mask, dilation can be used to restore the mask's original shape post-application of the median filter (5×5 kernel); in some cases, the median filter will erode the edges of the vessel mask in an attempt to remove lone pixels.

With the three masks, at block 326, the classification module 272 uses the registered FA scan to create three vectors containing the average image intensity of each masked region, for each image in the FA sequence. Using the vectors, at block 328, the classification module 272 determines one or more kinematic features for each detected microaneurysm; for example, kinematic features can include:

Microaneurysm Blood Flow Rate-using the microaneurysm mask;

Connected Vessel Blood Flow Rate-using the connected vessel mask; and

Parenchyma Slope-using the parenchyma mask.

Microaneurysm Blood Flow Rate

Figure 6:
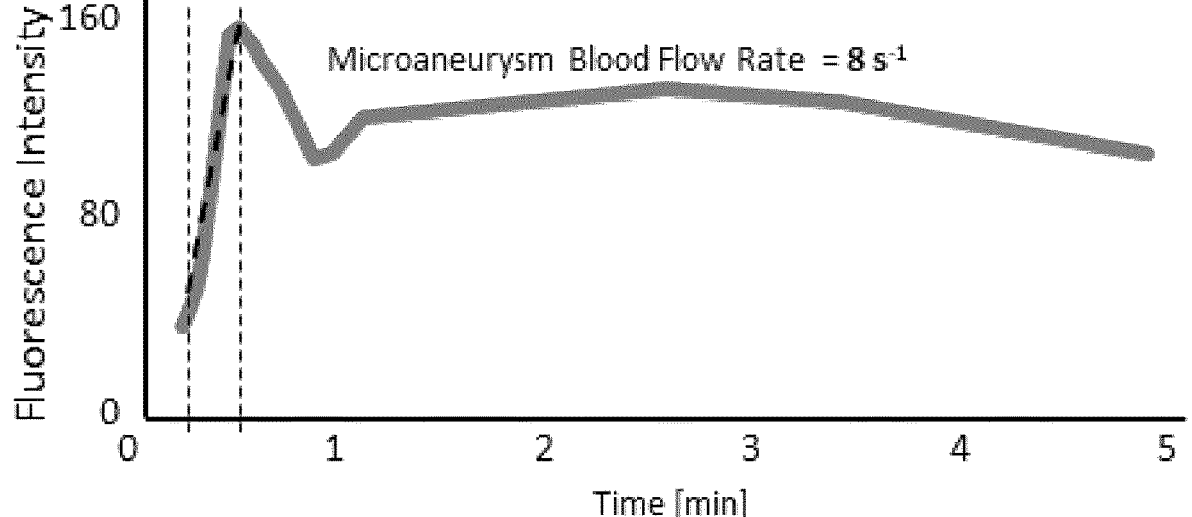
FIG. 6 illustrates an example of a microaneurysm average intensity profile along with its resulting linear fit, in accordance with the method of FIG. 2.

Utilizing the average intensity vector representative of the microaneurysm, the classification module 272 identifies a starting point and endpoint to determine the microaneurysm's blood flow rate. First, the classification module 272 identifies the maxima of the microaneurysm's average intensity curve; i.e., the maximum of the intensity curve is selected as the endpoint. To identify the starting point, the classification module 272 applies pre-processing to the intensity curve. First, the intensity curve is filtered using min-max normalization, raising 10 to the power of the intensity vector, and then min-max normalizing again. The starting point is then identified as the point in the filtered intensity vector before exceeding a defined intensity value (for example, 0.05). For example, if at a given timepoint the intensity value is 0.04 and the proceeding timepoint has an intensity value of 0.12, the first timepoint will be identified as the start of the sequence. With the starting points and endpoints identified, the microaneurysm blood flow rate is determined using the method of least squares. FIG. 6 is an example of a microaneurysm average intensity profile along with its resulting linear fit.

Connected Vessel Blood Flow Rate

Figure 7:
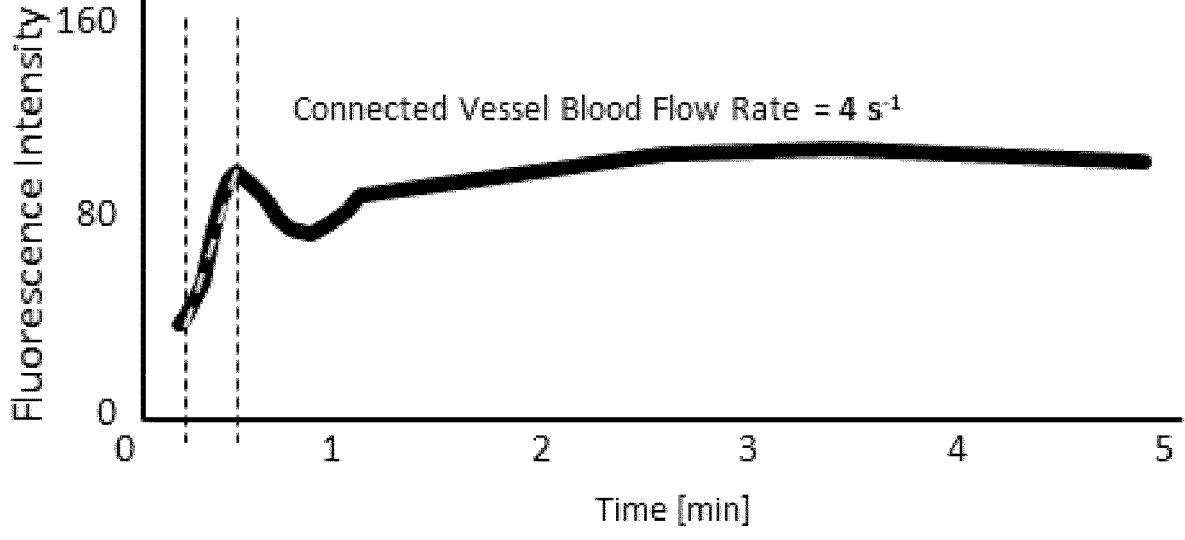
FIG. 7 illustrates an example of a connected vessel's average intensity profile along with its resulting linear fit, in accordance with the method of FIG. 2.

The classification module 272 determines the connected vessel blood flow rate in the same manner as the microaneurysm blood flow rate, except with the use of the average intensity vector of the connected vessel mask. A starting point and endpoint are identified using the same methodology, and the connected vessel blood flow rate is determined using the method of least squares. FIG. 7 is an example of a connected vessel's average intensity profile along with its resulting linear fit.

Parenchyma Slope

The classification module 272 determines the parenchyma slope, representative of the parenchyma leakage rate, similarly to the microaneurysm and connected vessel blood flow rate, however, with a few differences. Advantageously, determining slope allows for the ability to quantify blood flow kinematics in microaneurysms, their connected vessel, and the rate at which the microaneurysm is leaking (if they are) into the parenchyma.

Figure 8:
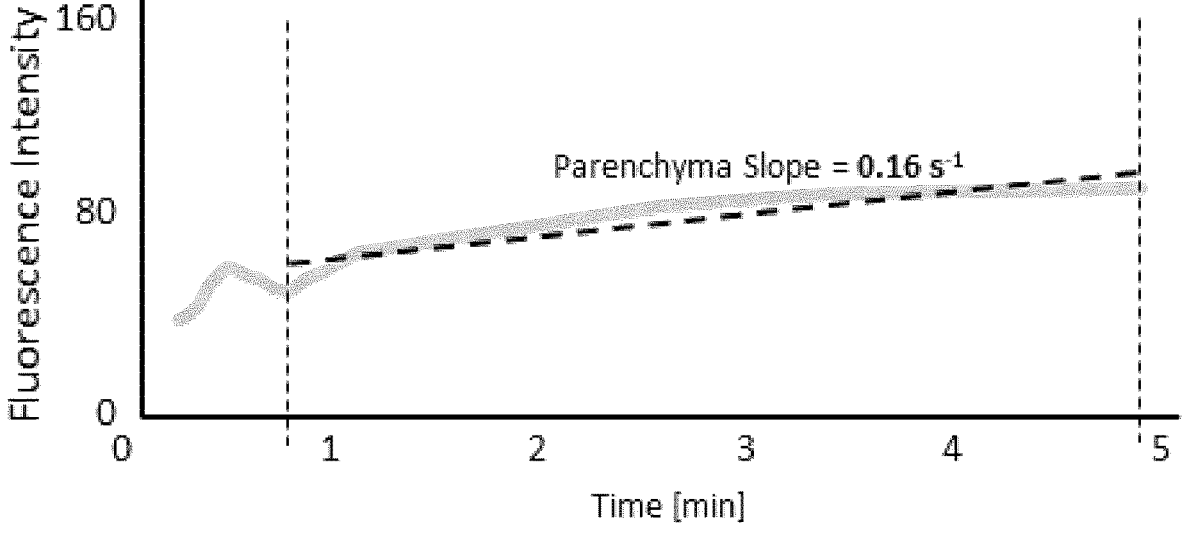
FIG. 8 illustrates an example of a parenchyma average intensity profile along with its resulting linear fit, in accordance with the method of FIG. 2.

To measure leakage, the classification module 272 examines the late phase of the FA scan. First, the classification module 272 determines an endpoint as the last entry within the parenchyma mask's average intensity vector. The classification module 272 generates a smaller vector containing a section of the parenchyma's late phase intensities; this smaller vector contains the parenchyma's intensities between a maximum of the microaneurysm's intensity vector and a defined period post-maximum (for example, 30 seconds post-maximum). In some cases, the average intensity vector is filtered using min-max normalization, raising 10 to the power of the intensity vector, and min-max normalizing again. A starting point is then identified as the point in the filtered intensity vector that occurs prior to dropping below a defined intensity value (for example, an intensity value of 0.05). For example, if at one timepoint the intensity value is 0.12 and the proceeding timepoint is 0.04, the later time point will be identified as the starting point. With the starting and endpoints identified, the parenchyma slope is determined by the classification module 272 using the method of least squares. FIG. 8 is an example of a parenchyma average intensity profile along with its resulting linear fit. In some cases, other classifications utilizing slope determinations can be used (e.g., different measures of rate of change over specific time series and/or phases of the angiogram).

Figure 9:
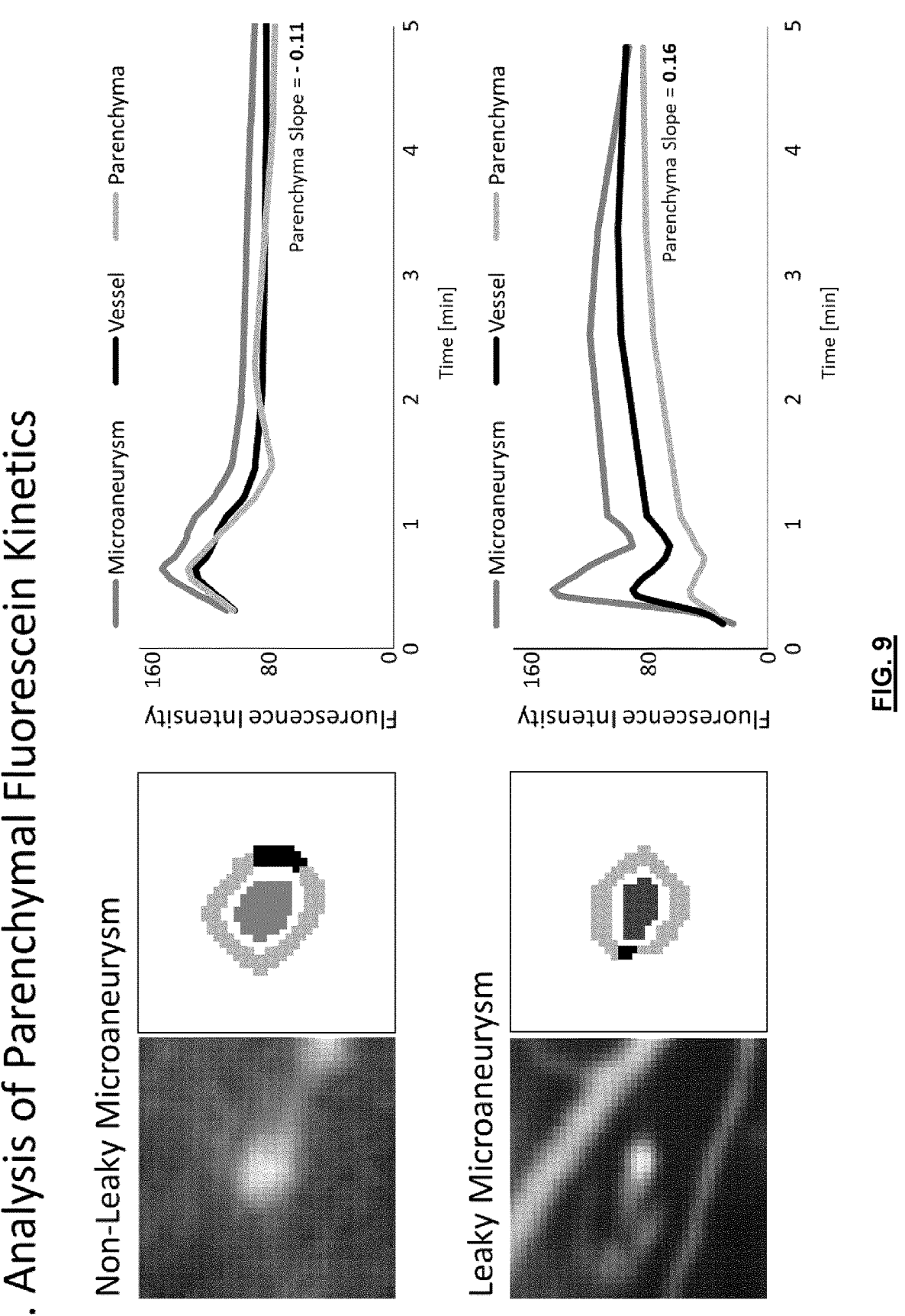
FIG. 9 illustrates an example of intensity profiles for masks in both a leaky and non-leaky microaneurysm, in accordance with the method of FIG. 2.

At block 330, the classification module 272 classifies whether each respective microaneurysm is leaky or not. If the resulting parenchyma slope for a given detected microaneurysm is positive (i.e., dye accumulation), then the microaneurysm is classified as leaky. Conversely, if the parenchyma slope is either zero or negative (i.e., no dye accumulation), then the microaneurysm is classified as non-leaky. FIG. 9 shows an example of intensity profiles for each of the three masks in both a leaky and non-leaky microaneurysm.

Figure 10:
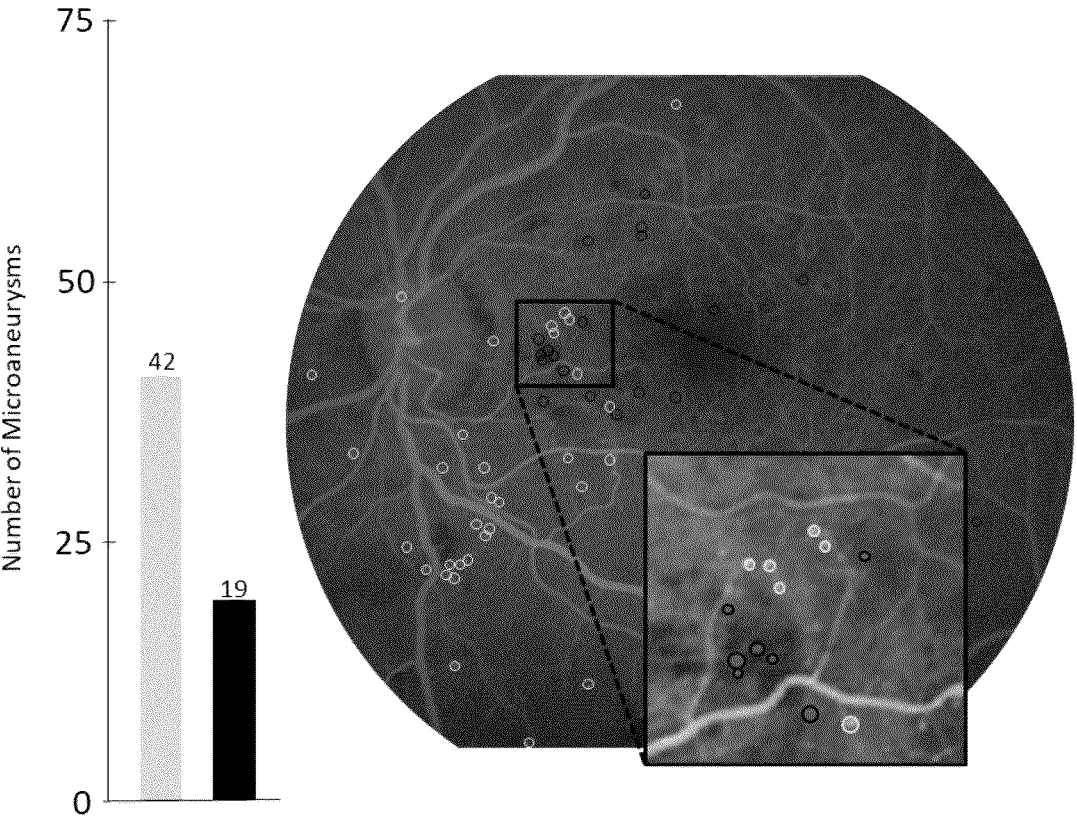
FIG. 10 illustrates an example of an output of classified microaneurysms in a visualization, in accordance with the method of FIG. 2.
Figure 12A:
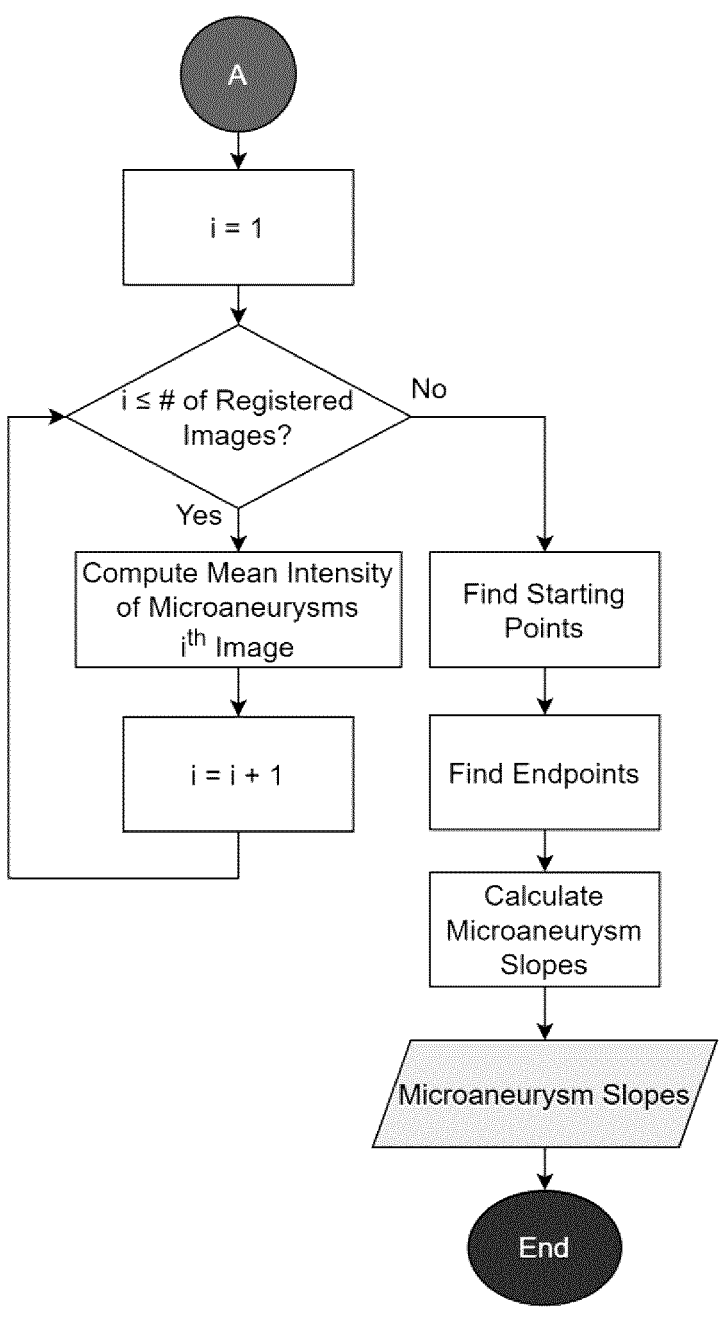
FIGS. 12A, 12B, and 12C illustrates a flowchart of an example approach for classifying microaneurysms and determining kinematic features in furtherance with the flowchart of FIG. 11.
Figure 12B:
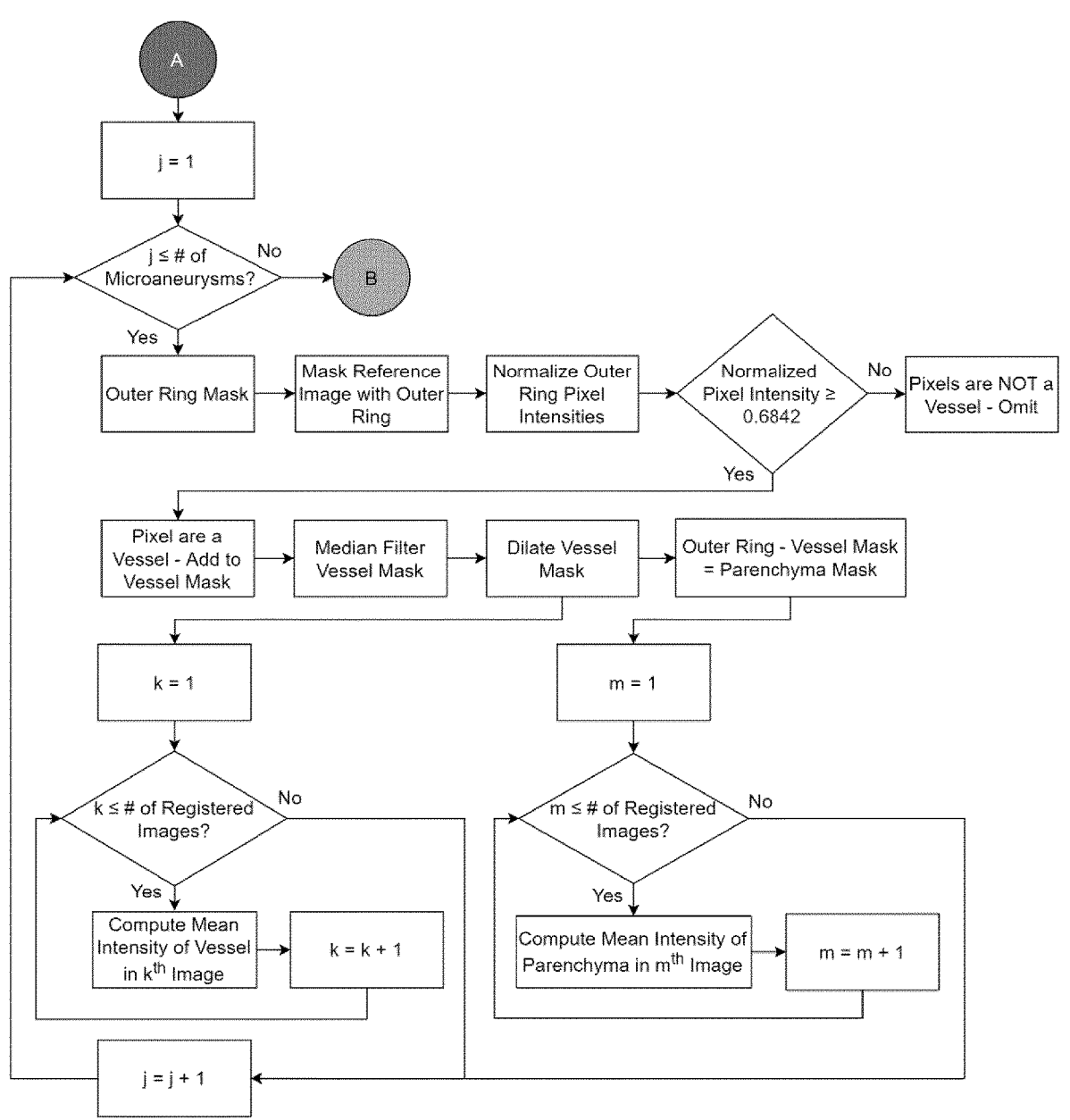
Figure 12C:
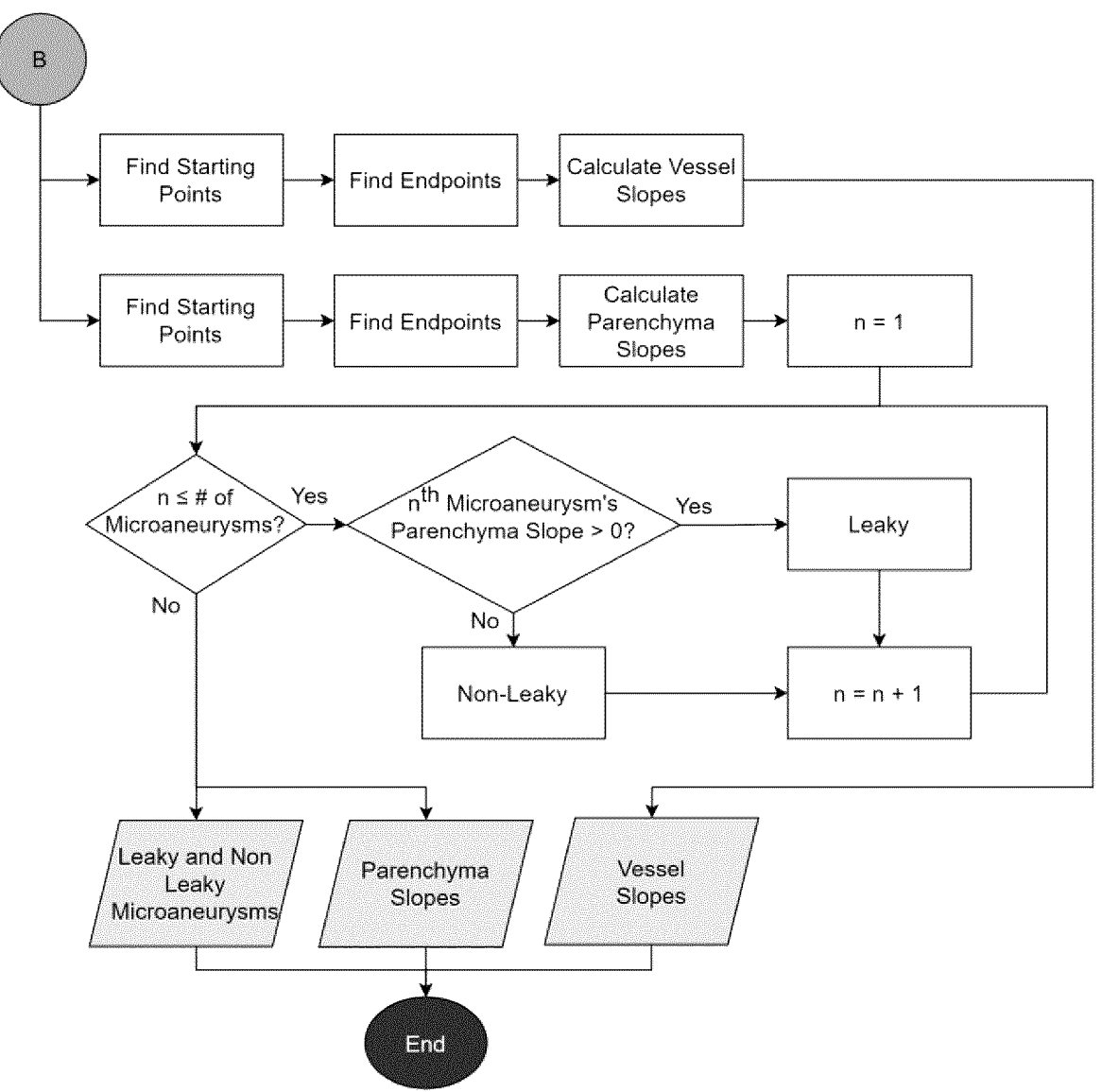

At block 332, the output module 274 outputs the classification for each detected microaneurysm, and in some cases, along with the detected microaneurysm itself, the kinematic features, and/or the shape metrics to the database 288, the network interface 276, and/or the I/O interface 268. In some cases, the classification can be outputted as an overlay on a retinal image where leaky and non-leaky microaneurysms are represented by two different colors alongside a visualization depicting the number of each microaneurysm type. FIG. 10 illustrates an example of an output of the classified microaneurysms in a visualization. FIG. 12 illustrates a flowchart of an example approach for classifying microaneurysms in accordance with the present embodiments.

In further cases, the classification module 272 can determine perfusion along with, or instead of, determining microaneurysms. Perfusion is determined as a rate of enhancement between the choroidal flush and arteriovenous stages of the FA scan. This period is identified between the first frame with the presence of dye (for example, approximately 10 seconds post-injection) and the image with maximal fluorescence (for example, approximately 23 seconds post-injection). Linear regression can be applied to the enhancement time-curve of every pixel, and pixels containing positive slopes can be defined as "non-ischemic", while those containing zero or negative slopes can be considered "ischemic".

The present inventors conducted example experiments to validate the advantages of the present embodiments. The example experiments included a retrospective analysis of two data sets of fluorescein angiography images. The first set of scans was from a previous study of 13 patients with diabetic retinopathy (2 moderate non-proliferative, 8 severe non-proliferative, and 3 proliferative) and 7 healthy volunteers. Scans from this set were acquired with a Topcon 50EX camera using a 50° Field of view. The second set of scans is of 15 patients with diabetic retinopathy (4 non-proliferative and 11 proliferative). Scans from this data set were obtained with an Optos 200Tx camera, using a 200° Field of view.

To study the potential association between local BRB leakage, ischemia, and microaneurysms, the example experiments examined these markers of pathology in a 6 mm circular grid. The area of each quadrant was 7.07 mm², covering ~350 thousand pixels in all the narrow-field scans (50,095 px/mm²), and ~40 thousand pixels in the ultrawide-field scans (5,550 px/mm²). The grid was centered on the fovea, with the width of the circular grid proportional in size to the width of the optic disc such that the optic disc serves as the proportion-reference (as it is assumed to be ~1.67 mm wide).

Figure 15:
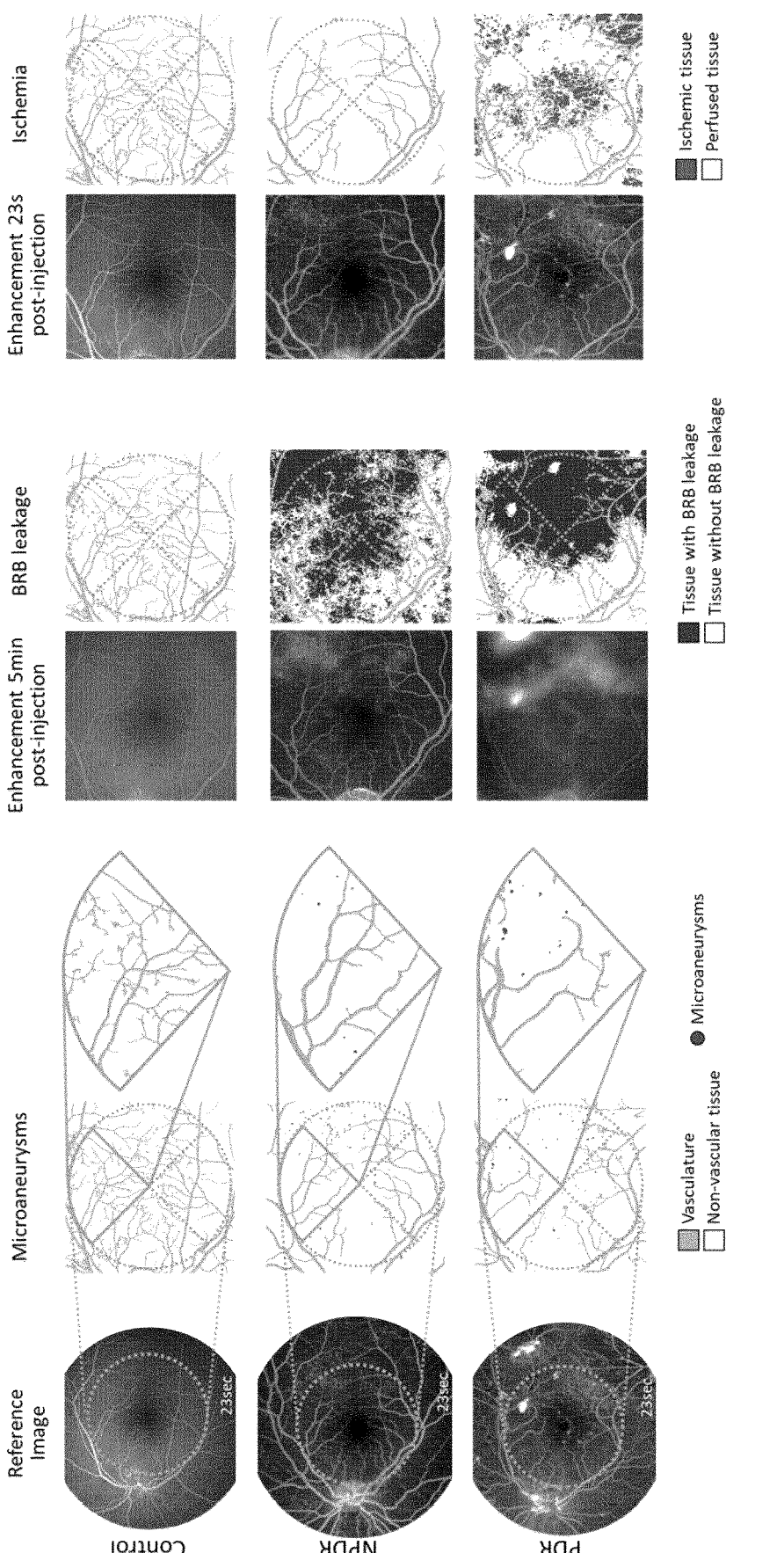
FIG. 15 illustrates examples of representative maps of microaneurysms, blood-retina-barrier leakage, and ischemia in accordance with example experiments.

The grid was applied to maps of microaneurysms, BRB leakage, and ischemia generated for each subject, as illustrated in FIG. 15. For each quadrant, the number of microaneurysms, percent of pixels with BRB leakage (latent-enhancement slope>0), and percent of pixels with ischemia (early-enhancement slope≤0) were determined. To determine the threshold for 'non-pathological' percent of voxels with BRB leakage or ischemia, first these parameters were determined in the control scans. For every control subject, the percent of pixels with BRB leakage in each quadrant was determined. Next, the maximal value of all control subjects (6.64% of the quadrant with BRB leakage) was determined and used as the 'pathological' BRB leakage threshold. Similarly, the percent of ischemic pixels per quadrant was determined in the control group. In this case, the maximal value was zero (0% of the quadrant with ischemia), indicating that detection of any ischemic pixels in a quadrant is 'pathological'.

FIG. 15 illustrates that for each scan, the present embodiments can generate maps of microaneurysms, BRB leakage, and ischemia. Maps of microaneurysms, representative of the 3 groups (healthy controls, non-proliferative diabetic retinopathy (NPDR), and proliferative diabetic retinopathy (PDR)), demonstrate that the present embodiments detect microaneurysms (blobs) in NPDR and PDR patients, yet not in controls. Corresponding maps of BRB leakage and ischemia apparent pathology in NPDR and PDR patients.

In the example experiments, FA scans of 14 patients with PDR, 14 patients with NPDR, and 7 healthy controls were analyzed. The groups had similar sex and age distribution. All scans were analyzed using the present embodiments, and maps of detected microaneurysms were generated for each scan. To identify microaneurysms, a 6 mm circular grid was centered on the fovea, dividing the macula into 4 quadrants (as illustrated in FIG. 15). The number of microaneurysms was quantified in a total of 28 quadrants from healthy controls, 56 quadrants from patients with NPDR, and 56 quadrants from patients with PDR. Microaneurysms were found in 2 control quadrants (7%), 49 NPDR quadrants (87.5%), and 53 PDR quadrants (94.6%). All differences were statistically significant ($p < 0.05$).

Figure 16A:
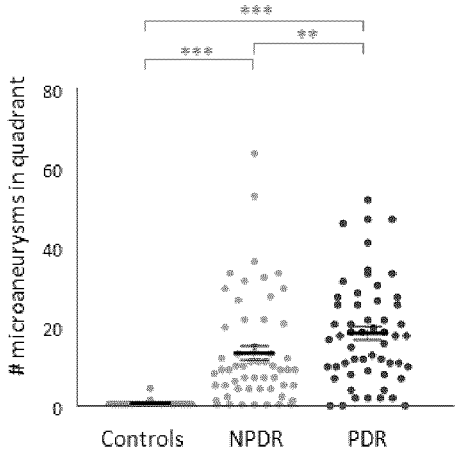
FIG. 16A illustrates a chart showing microaneurysms in controls, non-proliferative diabetic retinopathy (NPDR), and proliferative diabetic retinopathy (PDR) subjects, in accordance with the example experiments.
Figure 16B:
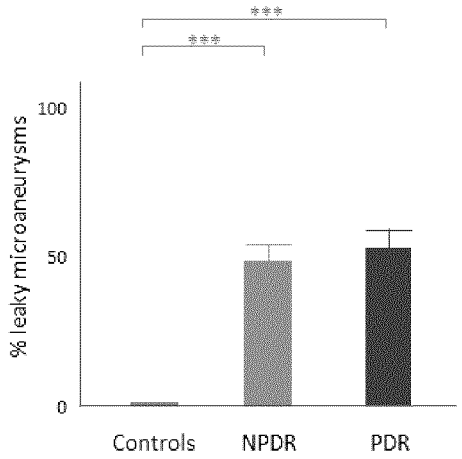
FIG. 16B illustrates a chart showing percent of that are leaky, in accordance with the example experiments.
Figure 16C:
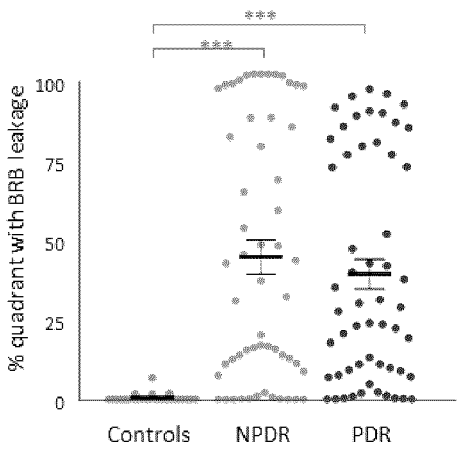
FIG. 16C illustrates a chart showing blood-retina-barrier (BRB) leakage in controls, NPDR, and PDR, in accordance with the example experiments.
Figure 16D:
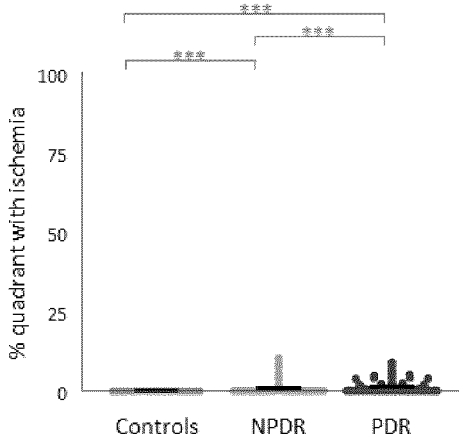
FIG. 16D illustrates a chart showing ischemia in controls, NPDR, and PDR, in accordance with the example experiments.

FIG. 16A to 16D illustrate results from quantification of microaneurysms, BRB leakage, and ischemia. FIG. 16A shows that the PDR group had 18.70±1.77 microaneurysms per quadrant, the NPDR group had 13.32±1.85 microaneurysms per quadrant, and the controls had 0.18±0.15. All differences were statistically significant ($p < 0.05$). FIG. 16B shows the percent of leaky-microaneurysms within each quadrant, per diagnosis. On average, ~50% of microaneurysms in the PDR group were found to be leaky, and ~47% were leaky in the NPDR groups (the difference was not statistically significant; p=0.682). No leaky microaneurysms were found in controls. FIG. 16C shows that BRB leakage affected 44% of tissue within NPDR quadrants, and 38% of tissue within PDR quadrants (no significant difference was found between these groups; p=0.472). BRB leakage affected less than 3.6% of control quadrants, significantly less than the NPDR and the PDR groups ($p < 0.001$). FIG. 16D shows that patients with PDR had the highest percentage of ischemia per quadrant, followed by NPDR and controls.

Figure 17A:
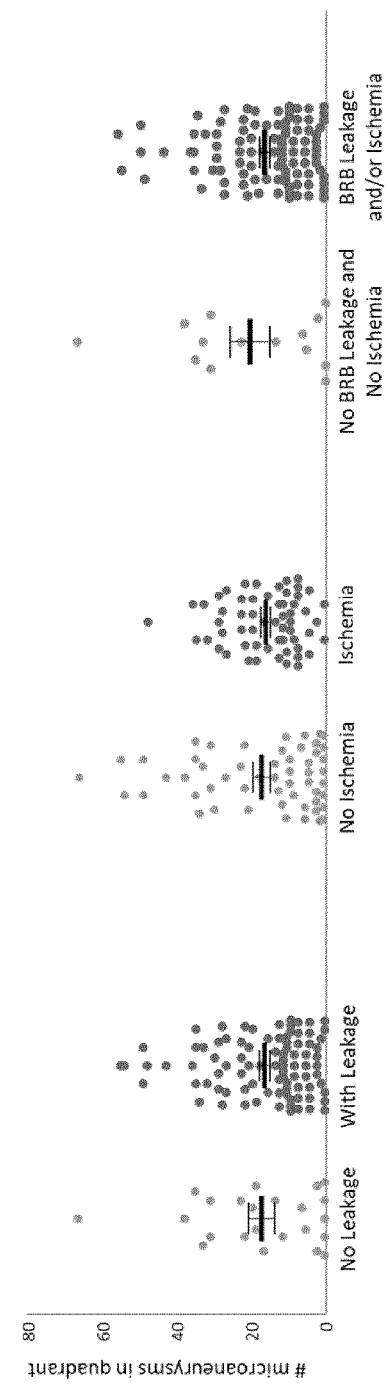
FIG. 17A illustrates a chart showing the number of microaneurysms in quadrants with or without BRB leakage and/or ischemia, in accordance with the example experiments.
Figure 17B:
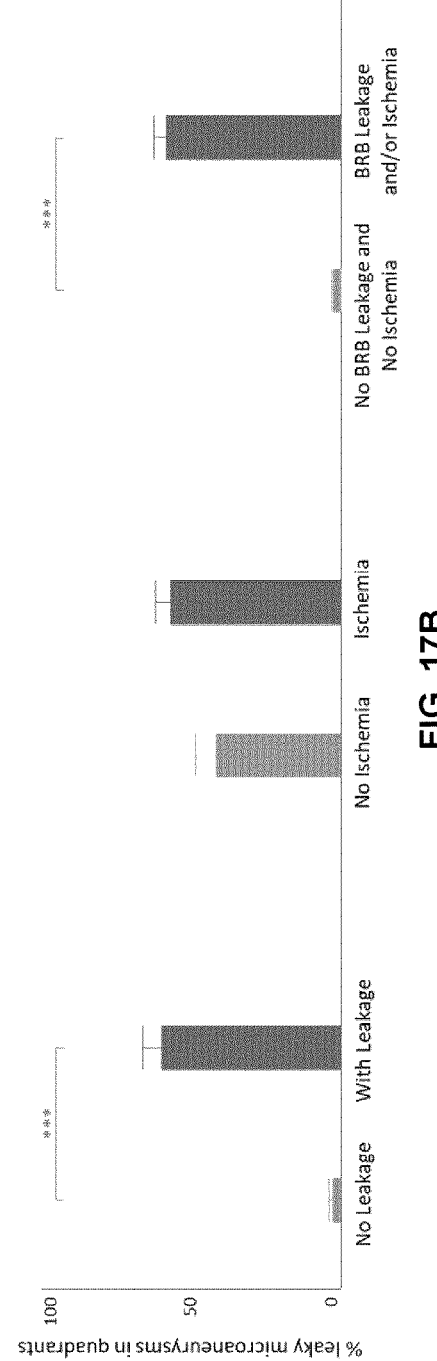
FIG. 17B illustrates a chart showing the percent of microaneurysms that are leaky in quadrants with or without BRB leakage and/or ischemia, in accordance with the example experiments.
Figure 18:
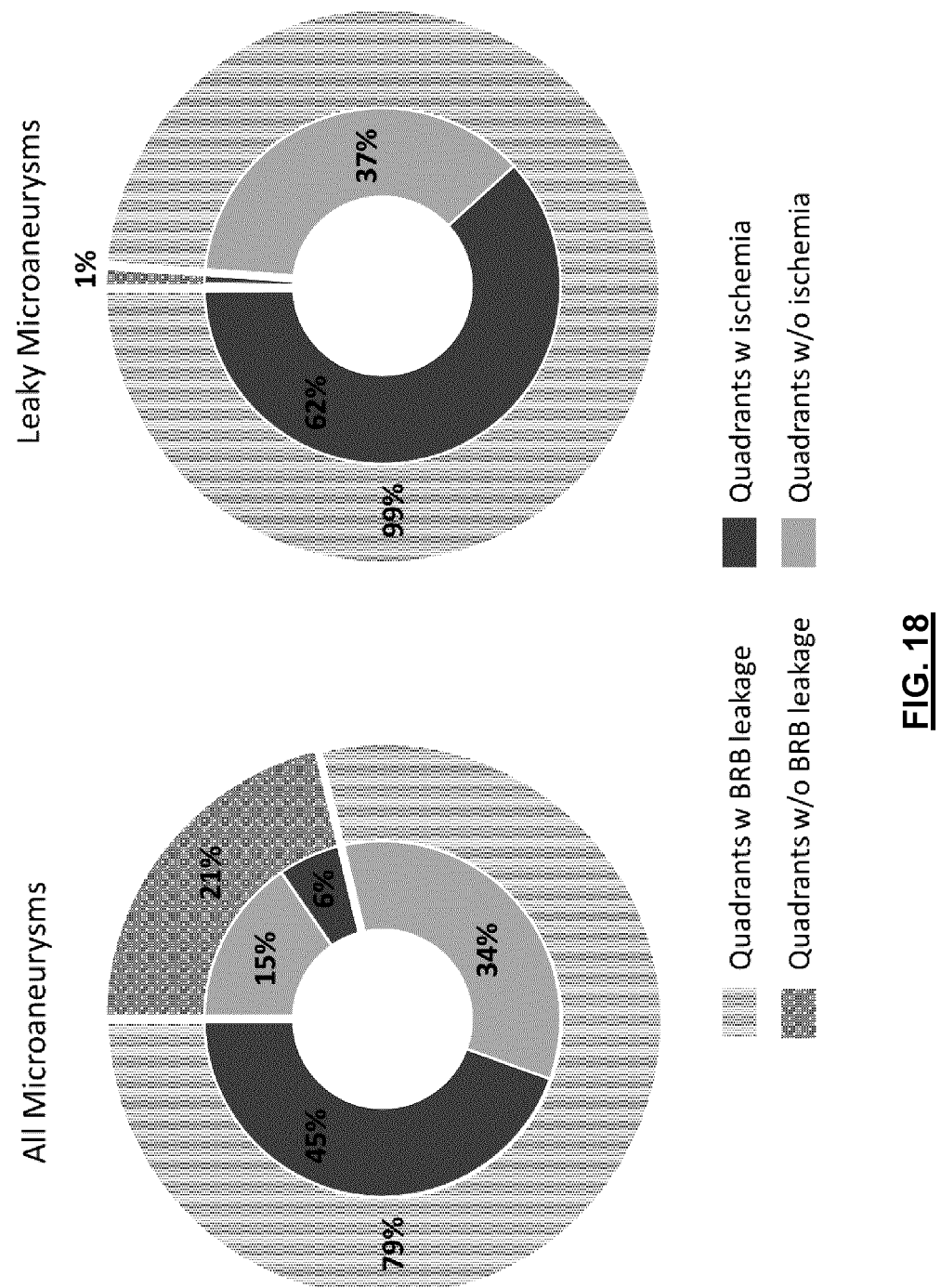
FIG. 18 illustrates a chart showing colocalization of microaneurysms with BRB leakage and ischemia.

The example experiments also examined a potential association between microaneurysms and leakage or ischemia. FIGS. 17A and 17B illustrate the presence of detected microaneurysms in the absence of other features of retinal pathologies, such as BRB leakage and ischemia. No differences in microaneurysm counts were noted between: (1) quadrants with, versus without, BRB leakage (p=0.871, FIG. 17A); (2) quadrants with versus without ischemia (p=0.317, FIG. 17A); and (3) quadrants with neither BRB leakage nor ischemia versus quadrants with either/both pathological features (p=0.682, FIG. 17A). Notably, 15% of all microaneurysms were found in quadrants without BRB leakage or ischemia (FIG. 18). These results indicate the presence of microaneurysms is independent of BRB leakage or ischemia. Microaneurysms within quadrants with BRB leakage were far more likely to be leaky (60.8%), compared to microaneurysms within quadrants without BRB leakage (2.4%, p<0.001; FIG. 17B), and 99% of all leaky microaneurysms were found in quadrants with BRB leakage (FIG. 18).

Microaneurysms in quadrants with vs. without ischemia were equally likely to be leaky (55% and 41.7%, respectively; p=0.110; FIG. 17B). Only 0.2% of leaky microaneurysms were found in quadrants without BRB leakage or ischemia (FIG. 18).

Advantageously, the presently described embodiments allow for the capture of additional information regarding the blood flow characteristics of microaneurysms. Research has shown a linkage between microaneurysm blood flow characteristics and diabetic retinopathy progression. As another advantage, the present embodiments are able to evaluate whether a microaneurysm is leaky or non-leaky, which can aid ophthalmologists in the targeted treatment of microaneurysms. As an example, leaky microaneurysms contribute to retinal thickening in patients with diabetic retinopathy and leaky microaneurysms are correlated with the presence of BRB leakage.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A method for detecting and classifying retinal microaneurysms, the method executed on a computing device, the method comprising:

receiving a time sequence of fluorescein angiography input images; generating a binarized map of hyperfluorescent elements in the input images;

detecting microaneurysms in the binarized map based on pixel connectivity for hyperfluorescent elements in the binarized map and by grading against a combination of morphological grading metrics;

classifying each of the detected microaneurysms as leaky or not leaky; and outputting the classifications of the detected microaneurysms.

2. The method of claim 1, wherein classifying each of the detected microaneurysms as leaky or not leaky comprises:

identifying an outer ring mask surrounding the detected microaneurysm;

identifying parenchyma by applying the outer ring mask and determining fluorescence intensity;

determining a rate of change of fluorescence intensity; and classifying the detected microaneurysm as leaky or not leaky based on the rate of change of the fluorescence intensity.

3. The method of claim 2, wherein classifying the detected microaneurysm as leaky or not leaky comprises classifying the detected microaneurysm as leaky where the rate of change is positive and classifying the detected microaneurysm as not leaky where the rate of change is negative or zero.

4. The method of claim 3, further comprising performing rigid and non-rigid registration on the input images, comprising:

for each input image, performing a rigid registration of the input image to a fixed image; and for each input image, performing a non-rigid registration of the image to the fixed image.

5. The method of claim 4, wherein rigid registration comprises performing feature detection and extraction to match features between the input image and the fixed image and removing non-matching features, and determining a geometric transformation for the matching features.

6. The method of claim 5, wherein non-rigid registration comprises filtering both the input image and the fixed image using a two-dimensional Gaussian blur function and subtracting the result from both original input images, respectively.

7. The method of claim 6, wherein non-rigid registration further comprises determining a displacement field that aligns the input image to the fixed image, determining a structural similarity (SSIM) index measures for the registered image after application of the displacement field using additive displacement of pixel locations, and comparing the determined SSIM index to an SSIM index determined for the input image, and where the SSIM index is higher than the input image, the registered image is used, otherwise, the input image is used.

8. A system for detecting and classifying retinal microaneurysms, the system comprising a processing unit and memory storage, the processing unit in communication with the memory storage and configured to execute:

a preprocessing module to receive a time sequence of fluorescein angiography input images, and to generate a binarized map of hyperfluorescent elements in the input images;

a detection module to detect microaneurysms in the binarized map based on pixel connectivity for hyperfluorescent elements in the binarized map and by grading against a combination of morphological grading metrics;

a classification module to classify each of the detected microaneurysms as leaky or not leaky; and an output module to output the classifications of the detected microaneurysms.

9. The system of claim 8, wherein classifying each of the detected microaneurysms as leaky or not leaky comprises:

identifying an outer ring mask surrounding the detected microaneurysm;

identifying parenchyma by applying the outer ring mask and determining fluorescence intensity;

determining a rate of change of fluorescence intensity; and classifying the detected microaneurysm as leaky or not leaky based on the rate of change of the fluorescence intensity.

10. The system of claim 9, wherein classifying the detected microaneurysm as leaky or not leaky comprises classifying the detected microaneurysm as leaky where the rate of change is positive and classifying the detected microaneurysm as not leaky where the rate of change is negative or zero.

11. The system of claim 10, wherein the preprocessing module further performs rigid and non-rigid registration on the input images, comprising:

for each input image, performing a rigid registration of the input image to a fixed image; and for each input image, performing a non-rigid registration of the image to the fixed image.

12. The system of claim 11, wherein rigid registration comprises performing feature detection and extraction to match features between the input image and the fixed image and removing non-matching features, and determining a geometric transformation for the matching features.

13. The system of claim 12, wherein non-rigid registration comprises filtering both the input image and the fixed image using a two-dimensional Gaussian blur function and subtracting the result from both original input images, respectively.

14. The system of claim 13, wherein non-rigid registration further comprises determining a displacement field that aligns the input image to the fixed image, determining a structural similarity (SSIM) index measures for the registered image after application of the displacement field using additive displacement of pixel locations, and comparing the determined SSIM index to an SSIM index determined for the input image, and where the SSIM index is higher than the input image, the registered image is used, otherwise, the input image is used.

15. The system of claim 11, wherein the fixed image comprises a reference image as a maximum mean intensity image of the input images or the fixed image comprises a registered adjacent image.

16. The system of claim 8, wherein generating the binarized map further comprises labelling collections of connected pixels with equal values, determining regional properties for each of the collections of connected pixels, generating a non-vasculature mask based on thresholds for the regional properties, and subtracting the non-vasculature mask from the binarized map.

17. The system of claim 16, wherein the detection module further segments and removes blood vessels within the binarized map.

18. The system of claim 17, wherein segmenting and removing blood vessels comprises preprocessing the input images about the reference image using a combination of an adaptive histogram equalization, a median filter, and two-dimensional Gaussian filter blur functions.

19. The system of claim 17, wherein segmenting and removing blood vessels generates a filtered image determined as an input image subtracted by a first two-dimensional Gaussian filter, which is divided by the square root of a second two-dimensional Gaussian filter, the first two-dimensional Gaussian filter taking as input the input image and a standard deviation of the Gaussian distribution of 20, and the second two-dimensional Gaussian filter taking as input a square of the input image and a standard deviation of the Gaussian distribution of 4.

20. The system of claim 17, wherein segmenting and removing blood vessels within the binarized map comprises determining regional properties that comprise one or more of Perimeter, Area, Max Intensity, and Circularity, and wherein generating the non-vasculature mask is based on thresholds for the regional properties.

* * * * *